United States Patent [19]

Lucas et al.

[11] 4,070,140
[45] Jan. 24, 1978

[54] APPARATUS FOR MAKING PRECISELY PARTITIONED BULBOUS-SHAPE CONTAINER

[75] Inventors: Malcolm Bramel Lucas; Theodore Paul Merz; Robert Henry Van Coney, all of Cincinnati, Ohio

[73] Assignee: The Procter & Gamble Company, Cincinnati, Ohio

[21] Appl. No.: 493,307

[22] Filed: July 31, 1974

[51] Int. Cl.² .......................................... B29D 23/03
[52] U.S. Cl. ..................................... 425/533; 425/468
[58] Field of Search ............ 425/DIG. 204, 209, 214, 425/234, 468, 242, 242 B, 533; 264/97; 249/144, 146, 147, 151, 177, 175, 142

[56] References Cited

U.S. PATENT DOCUMENTS

| 3,189,422 | 6/1965 | Shea et al. | 425/DIG. 214 |
| 3,301,928 | 1/1967 | Plymale | 425/468 |
| 3,471,896 | 10/1969 | Ninneman | 425/DIG. 203 |
| 3,752,434 | 8/1973 | Herter | 425/468 |
| 3,889,920 | 6/1975 | Holbrook | 249/151 |

FOREIGN PATENT DOCUMENTS

| 1,166,457 | 3/1964 | Germany | 264/97 |
| 631,830 | 1/1962 | Italy | 425/DIG. 214 |
| 4,738,064 | 9/1972 | Japan | 264/94 |

Primary Examiner—Richard B. Lazarus
Attorney, Agent, or Firm—Thomas J. Slone; John V. Gorman; Richard C. Witte

[57] ABSTRACT

Apparatus comprising means for blow molding a preform having a body which is longitudinally partitioned by a bulkhead having the size, shape, and orientation required in a finished, precisely partitioned bulbous-shape container to convert the preform into such a finished bulbous-shape container while constraining the bulkhead from changing size, shape, or orientation during the blow molding operation. An integrated injection-blow molding embodiment is disclosed as well as discrete injection molding and blow molding apparatuses.

2 Claims, 39 Drawing Figures

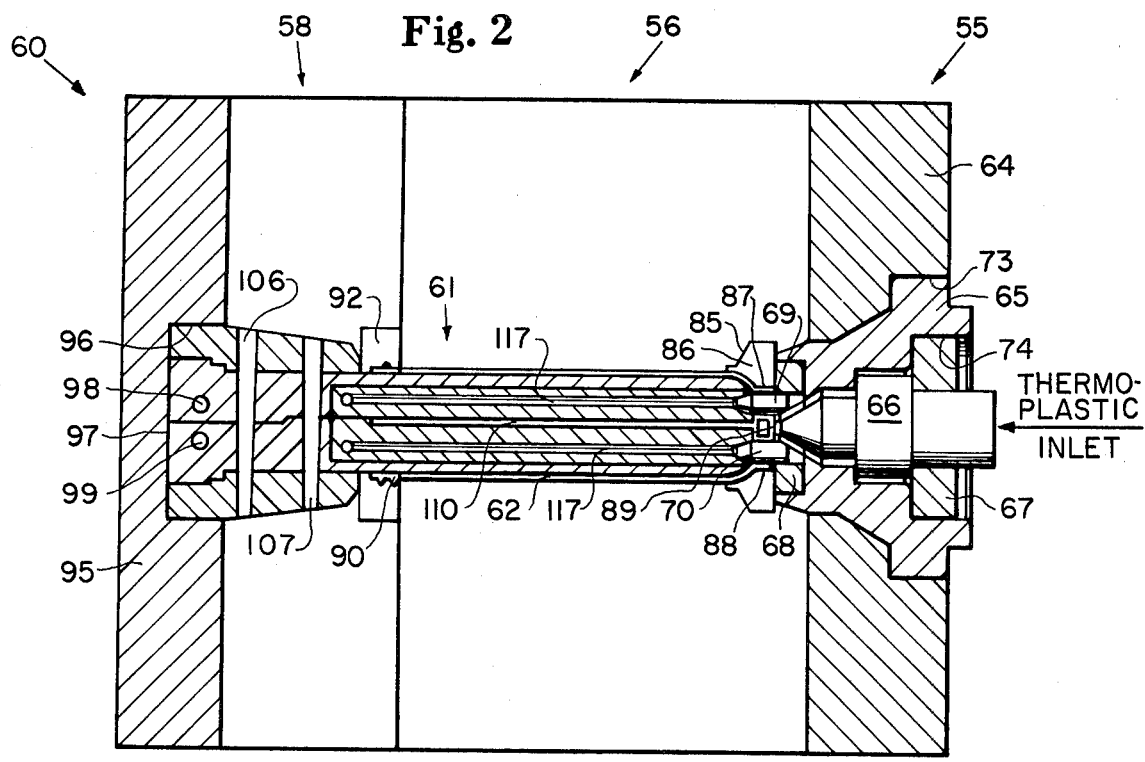
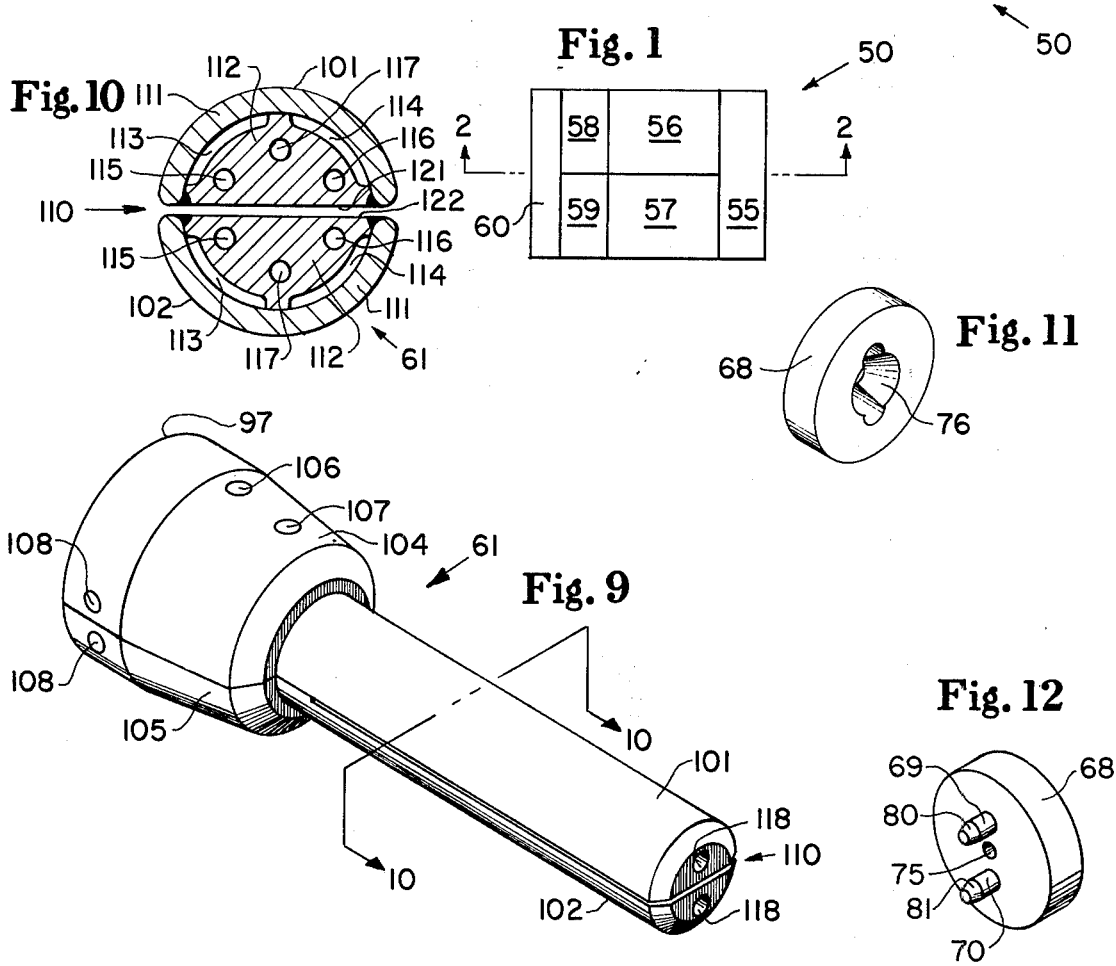

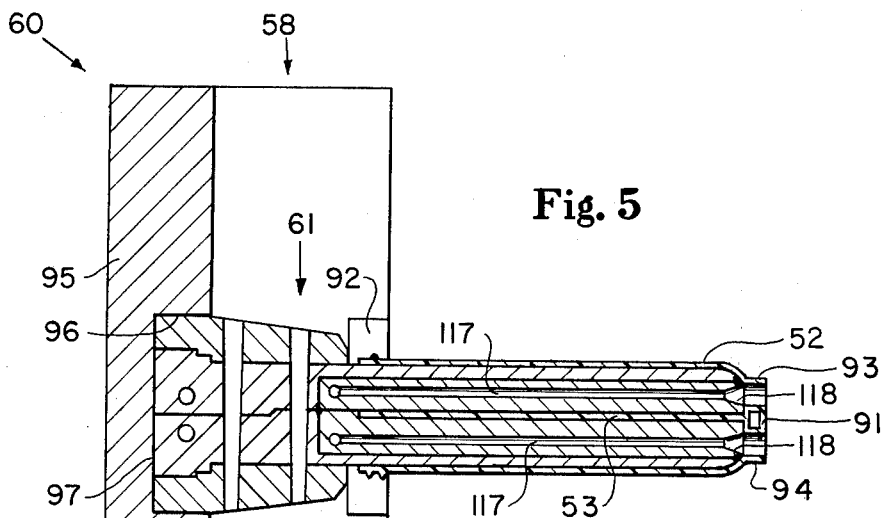
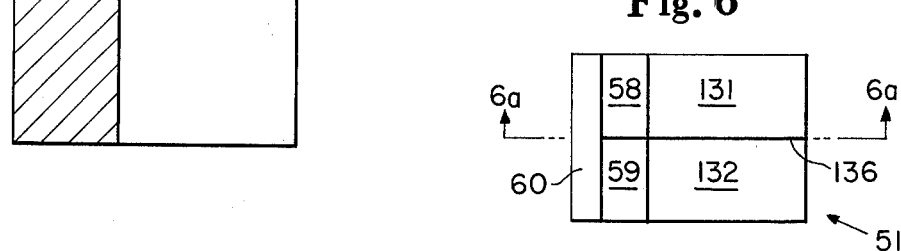
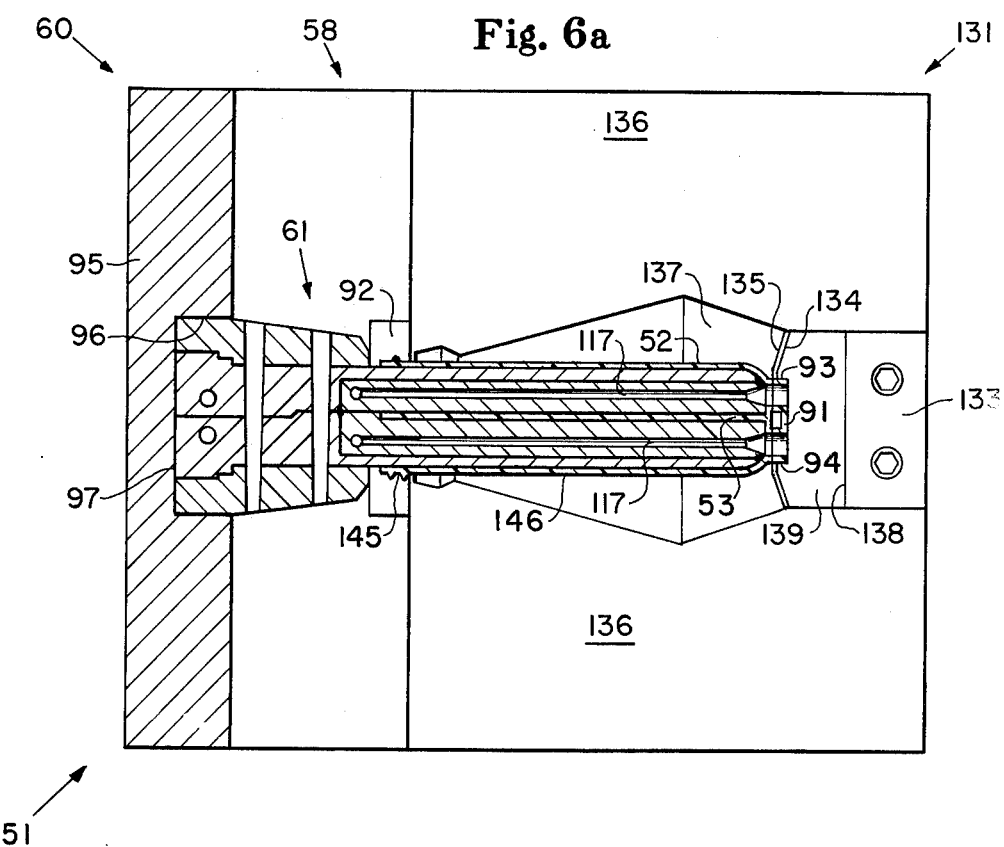

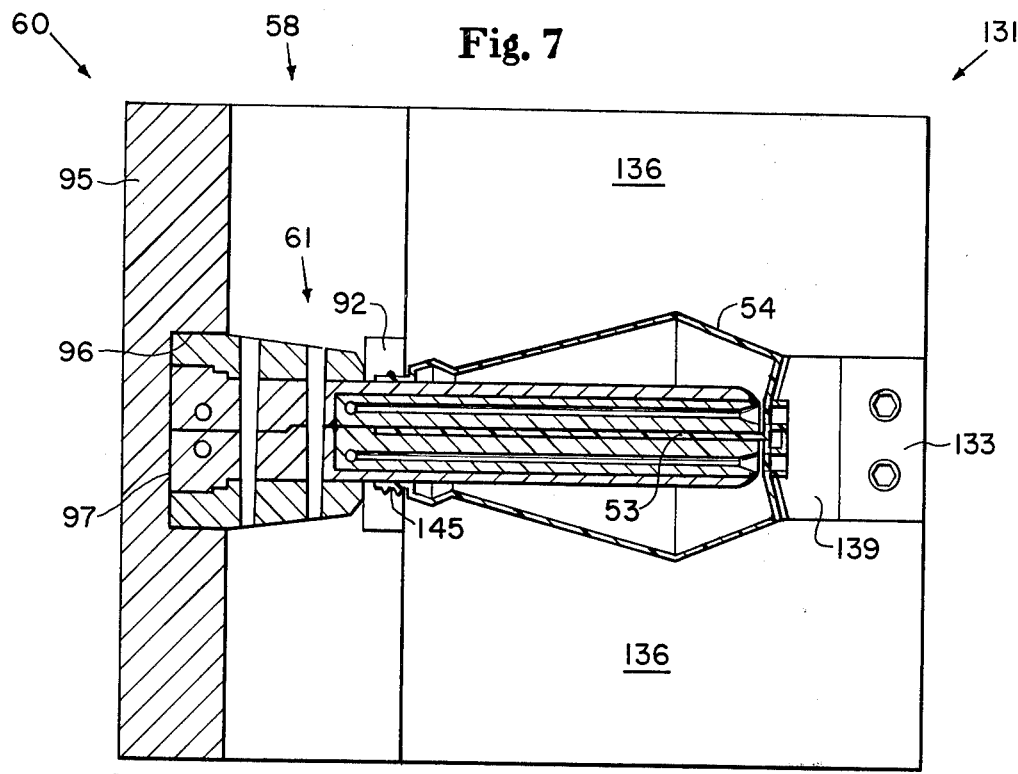
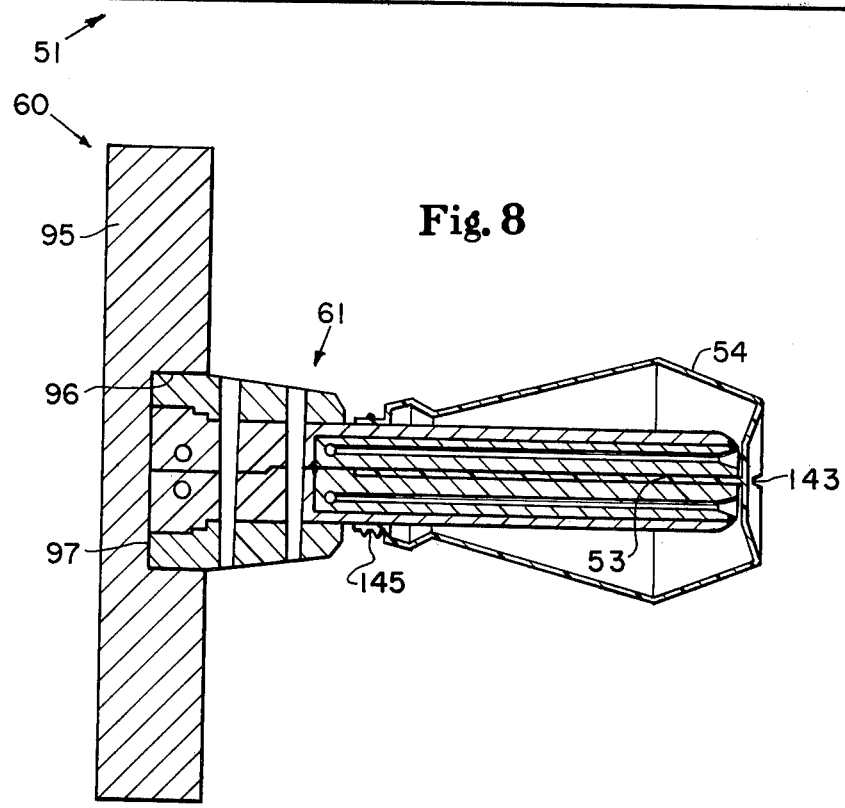

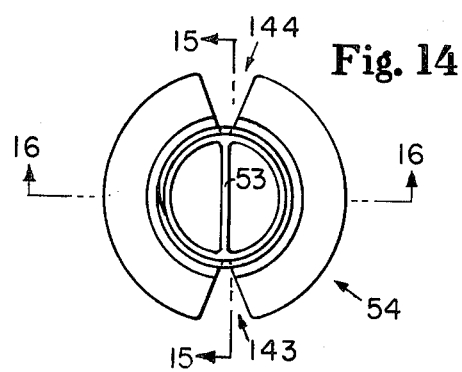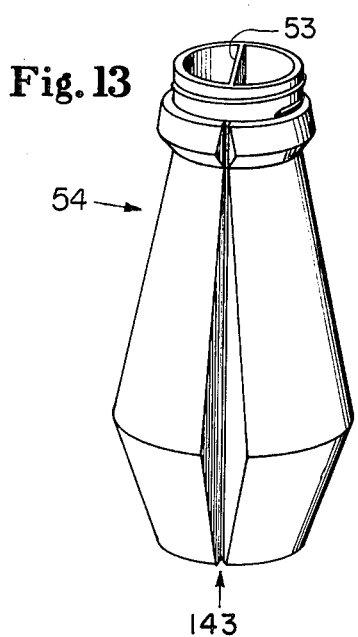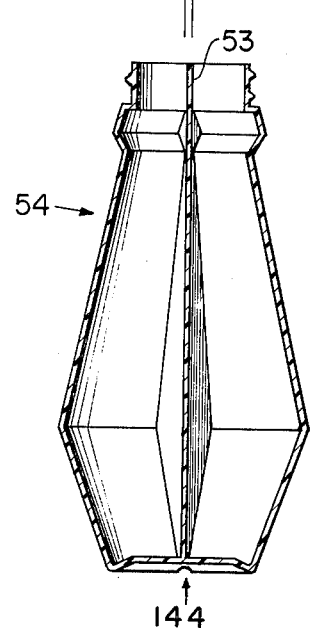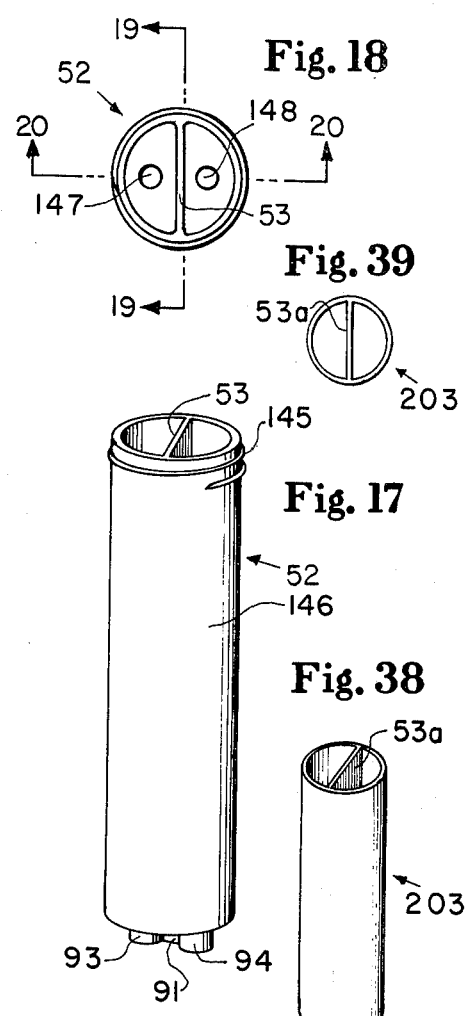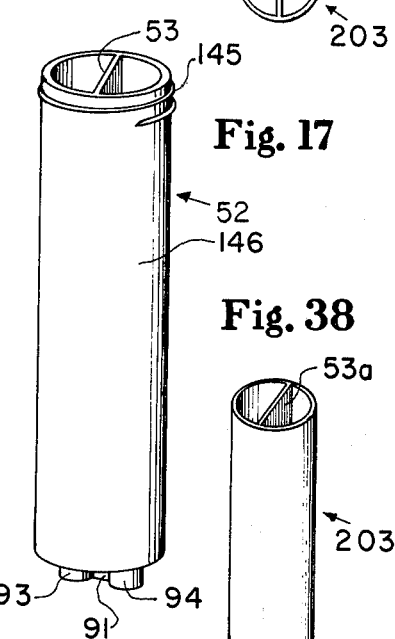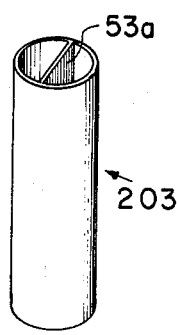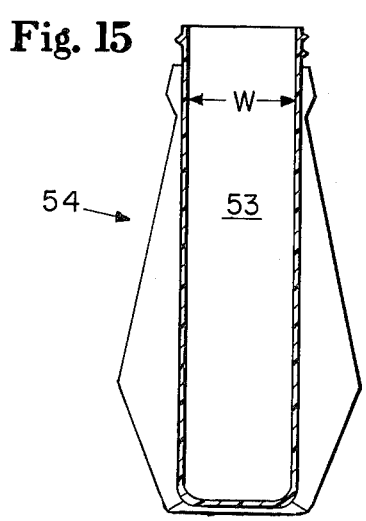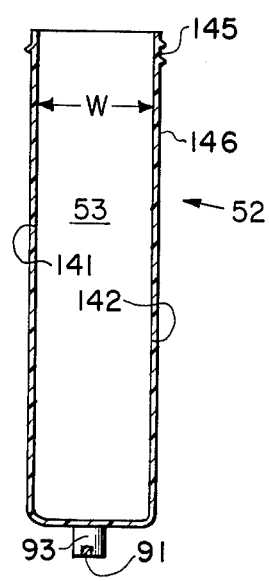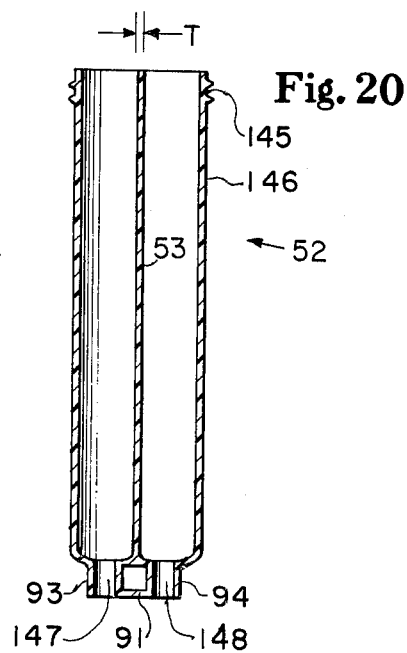

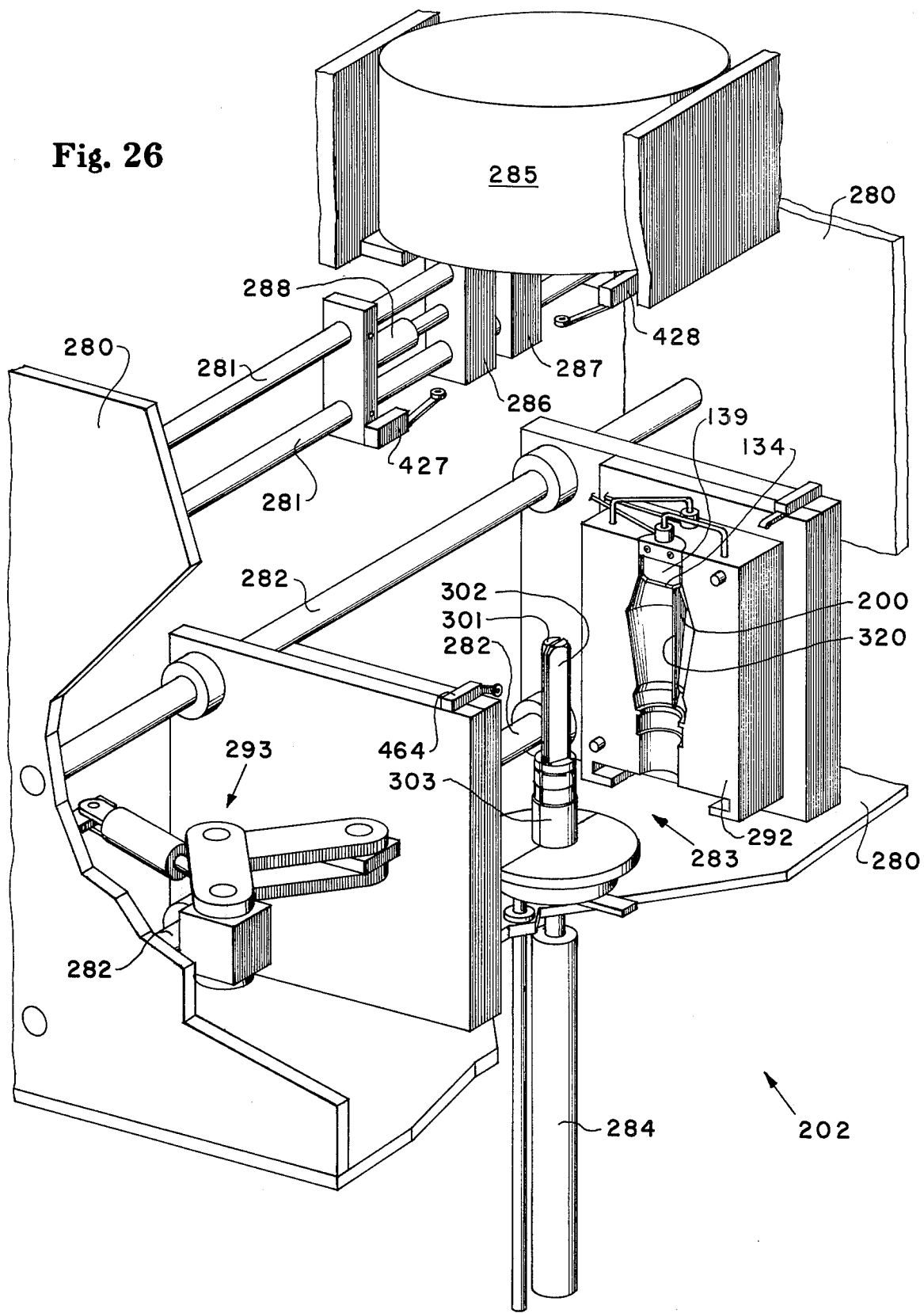

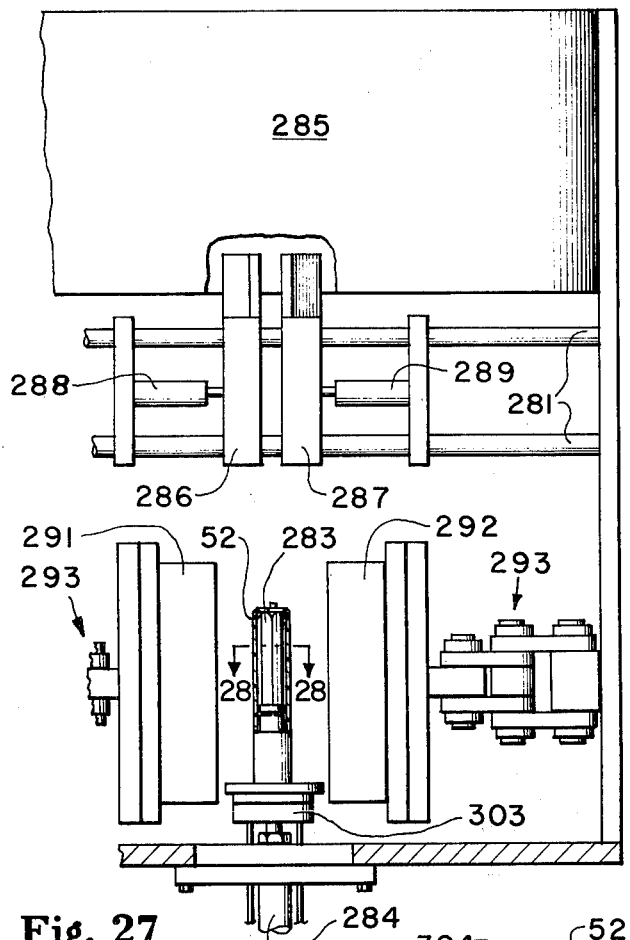
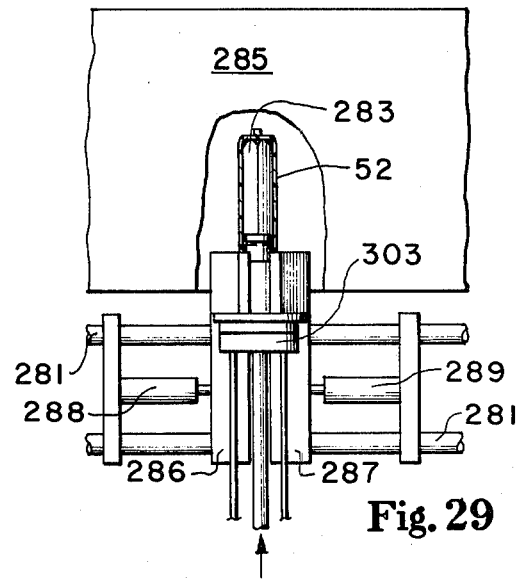
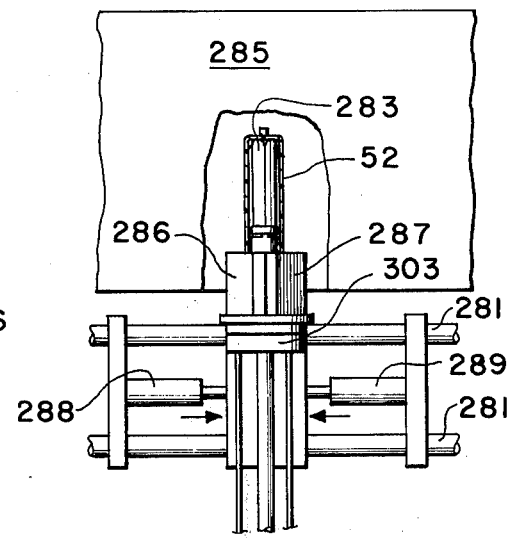
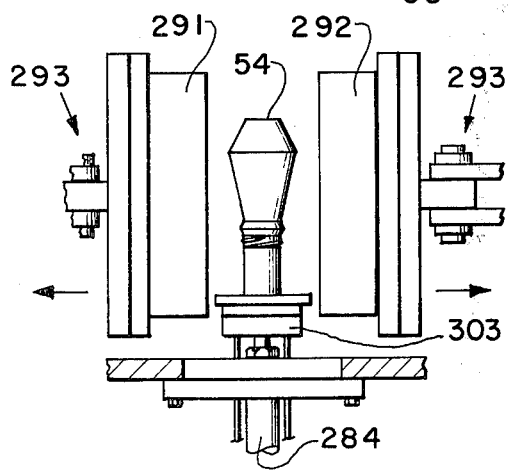
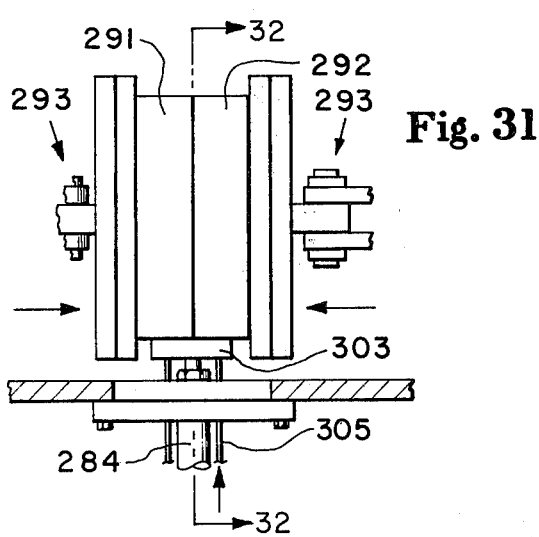

APPARATUS FOR MAKING PRECISELY PARTITIONED BULBOUS-SHAPE CONTAINER

CROSS REFERENCE TO RELATED APPLICATION

This application is related to the commonly assigned and concurrently filed application of Malcolm B. Lucas entitled "Precisely Partitioned Bulbous-Shape Container And Method Of Making It" filed July 31, 1974, Ser. No. 493,308 and now abandoned.

FIELD OF THE INVENTION

This invention relates generally to providing apparatus for making plural compartment containers such as thermoplastic bottles for separately storing and, perhaps, co-dispensing components of products which components are desirably not mixed until about the time the use thereof is contemplated. More specifically, the present invention relates to providing blow molding apparatus for making bulbous-shape containers of unitary construction which containers are each divided into compartments by a precisely sized, shaped, and oriented integral bulkhead. Such containers can be made by blow molding longitudinally partitioned tubular preforms or injection molded preforms.

BACKGROUND OF THE INVENTION

Blow-molded, bulbous-shaped, compartmented containers are disclosed in the prior art of which U.S. Pat. No. 2,065,504 issued Dec. 29, 1936 to Norman R. Beck, U.S. Pat. No. 2,285,707 issued June 9, 1942 to Charles B. Garwood et al., and U.S. Pat. No. 2,951,264 issued Sept. 6, 1960 to James Bailey are representative.

The prior art also discloses apparatus for making unpartitioned bulbous-shape containers of glass or thermoplastic material by blow molding injection molded preforms. U.S. Pat. No. 3,616,491 issued Nov. 2, 1971 to Gary L. Vollers, and U.S. Pat. No. 3,707,591 issued Dec. 26, 1972 to George A. Chalfant are, respectively, representative of prior art patents which disclose integrated apparatus for and methods of injection molding preforms and for subsequently blow molding the injection molded preforms to bulbous-shapes.

The prior art further discloses integrated injection-blow molding apparatus comprising spring biased members and other means for obviating flow of thermoplastic material into its blow-molding-gas passageways during the injection molding operation, and for subsequently admitting blow-molding gas through the passageways to effect blow molding a finished article. U.S. Pat. No. 3,412,186 issued Nov. 19, 1968 to Tadeusz Piotrowski, U.S. Pat. No. 3,441,982 issued May 6, 1969 to Toshio Sagara et al., and U.S. Pat. No. 3,609,803 issued Oct. 5, 1971 to Lazzaro A. Fattori are representative of such prior art. Sagara el al. also illustrate conversion of extruded tubular parisons into bulbous-shape containers by pinching one end of the parison closed and then blow molding the parison to the ultimate shape desired.

However, none of the prior art has solved all of the problems of providing apparatus for molding a bulbous-shape, plural compartment, top-opening container of unitary construction which container is divided into compartments by a precisely sized, shaped, and oriented integral partition or bulkhead to the degree or extent of the present invention.

OBJECTS OF THE INVENTION

The nature and substance of the present invention will be more readily appreciated after giving consideration to its major aims and purposes. The principal objects of the invention are recited in the ensuing paragraphs in order to provide a better appreciation of its important aspects prior to describing the details of a preferred embodiment.

A major object of the invention is providing apparatus for blow molding a precisely partitioned, bulbous-shape container from a longitudinally partitioned preform.

Another major object of the invention is providing apparatus for injection molding a relatively deep, longitudinally partitioned preform which preform can be blow molded to make a precisely partitioned, bulbous-shape container.

Still another major object of the invention is providing integrated injection-blow molding apparatus for making a precisely partitioned, bulbous-shape container of thermoplastic materials.

SUMMARY OF THE INVENTION

The objects of the invention recited above and other objects of the invention are achieved by providing an apparatus for making a precisely partitioned bulbous-shape container which apparatus comprises means for blow-molding the container from a preform comprising a tubular body and a longitudinally extending bulkhead of the size, shape, and orientation required in the container. The apparatus further comprises means for constraining the bulkhead from substantially changing size, shape or orientation during the blow molding operation. The apparatus may further comprise means for injection molding the preforms. The injection molding means may comprise a male mandrel for defining the interior geometry of the preform. The mandrel may have cantilevered bifurcations, and means for supporting the distal ends of the bifurcations to substantially obviate distortion and displacement of the bifurcations under the temperature and pressure conditions incident to injection molding thermoplastic materials. The apparatus may further comprise blow-molding-gas passageways, means for obviating flow of thermoplastic material into the passageways while the preform is being injection molded, and means for enabling blow-molding gas to pass into the preform through the passageways to effect blow molding the body of the preform to the ultimate bulbous-shape of the container.

BRIEF DESCRIPTION OF THE DRAWINGS

While the specification concludes with claims particularly pointing out and distinctly claiming the subject matter regarded as forming the present invention, it is believed the invention will be better understood from the following descriptions in conjunction with the accompanying drawings in which:

FIG. 1 is a small scale, top view of the injection molding portions of a preferred injection-blow molding apparatus embodying the present invention.

FIGS. 2 through 8 inclusive are sequential sectional views of the preferred embodiment injection blow molding apparatus which views show the sequence of injection molding a preform, and then blow molding the preform into a bulbous-shape container.

FIG. 2 is a medial sectional side elevational view of the preferred embodiment injection-blow molding apparatus taken along lien 2—2 of FIG. 1.

FIG. 3 is a medial sectional side elevation view of the apparatus as shown in FIG. 2 after a longitudinally partitioned preform has been injection molded therein.

FIG. 4 is a medial sectional side elevational view of the apparatus shown in FIG. 3 after the injection head assembly has been spaecd longitudinally from the injection molding body cavity halves of the apparatus.

FIG. 5 is a medial sectional side elevational view of the apparatus shown in FIG. 4 after the injection molding body cavity halves have been remotely spaced from the neck cavity halves and the butt plate assembly of the apparatus.

FIG. 6 is a small scale top view of the blow molding portions of a preferred embodiment injection molding apparatus which comprises the apparatus shown in FIG. 5 after front and rear blow molding cavity halves have been associated therewith.

FIG. 6a is a medial sectional side elevational view of the apparatus shown in FIG. 6 taken along line 6a-6a thereof.

FIG. 7 is a medial sectional side elevational view of the apparatus shown in FIG. 6 after the preform has been blow molded to convert the preform into a bulbous-shape container.

FIG. 8 is a medial sectional side elevational view of the apparatus shown in FIG. 7 after the neck cavity halves and the blow molding body cavity halves of the apparatus have been removed to leave a finished, blow molded, bulbous-shape container disposed on the mandrel of the apparatus.

FIG. 9 is a perspective view of a bifurcated male mandrel that is a part of the apparatus shown in FIG. 2.

FIG. 10 is a transverse cross-sectional view of the mandrel shown in FIG. 9 taken along line 10—10 thereof.

FIG. 11 is a perspective view of an insert of the apparatus shown in FIG. 2 in which view the visible circular-shape surface is the surface of the insert which faces the injection nozzle of the apparatus in FIG.2.

FIG. 12 is a perspective view of the insert shown in FIG. 11 in which view the visible circular-shape surface is the face of the insert which faces the distal end of the mandrel, FIG. 9, of the apparatus as shown in FIG. 2.

FIG. 13 is a perspective view of a preferred embodiment, longitudinally partitioned, bulbous-shape container produced through the use of apparatus embodying the present invention.

FIG. 14 is a top view of the container shown in FIG. 13.

FIG. 15 is a longitudinal (vertical) sectional view of the container shown in FIGS. 13 and 14 taken along line 15—15 of FIG. 14.

FIG. 16 is a longitudinal (vertical) sectional view of the container shown in FIGS. 13 and 14 taken along line 16—16 of FIG. 14.

FIG. 17 is a perspective view of an injection molded, longitudinally partitioned preform of the configuration shown in the injection molding apparatus of FIG. 3.

FIG. 18 is a top view of the preform shown in FIG. 17.

FIG. 19 is a longitudinal (vertical) sectional view of the preform shown in FIGS. 17 and 18 taken along line 19—19 of FIG. 18.

FIG. 20 is a longitudinal (vertical) sectional view of the preform shown in FIGS. 17 and 18 taken along line 20—20 of FIG. 18.

FIG. 26 is a fragmentary perspective view of a discrete blow molding apparatus for converting longitudinally partitioned preforms into longitudinally partitioned, bulbous-shape containers of the configuration shown in FIG. 13.

FIG. 27 is a fragmentary front elevational view of the blow molding apparatus of FIG. 26 showing a preform of the configuration of FIG. 17 disposed on a bifurcated male support intermediate blow molding cavity halves.

FIG. 28 is a transverse sectional view taken along line 28—28 of FIG. 27.

FIG. 29 is a fragmentary front elevational view of the blow molding apparatus of FIG. 27 after the preform has been telescoped upwardly into a heater.

FIG. 30 is a fragmentary front elevational view of the blow molding apparatus of FIG. 29 after neck protection members have been positioned to substantially obviate heating the neck of the preform while the preform is disposed in the heater of the apparatus.

FIG. 31 is a fragmentary front elevational view of the blow molding apparatus of FIG. 27 after the blow molding cavity halves have been closed about a heated preform.

FIG. 34 is a fragmentary front elevational view of the blow molding apparatus of FIG. 31 after the blow molding body cavity halves have been opened from about a blow molded, bulbous-shape container disposed therebetween.

FIG. 38 is a perspective view of an extruded. alternate embodiment, longitudinally partitioned tubular preform.

FIG. 39 is a top view of the alternate embodiment preform shown in FIG. 38.

DESCRIPTION OF THE PREFERRED EMBODIMENT

The preferred embodiment of the present invention is an integrated injection-blow molding apparatus comprising injection molding means 50, FIGS. 1 and 2, and blow molding means 51, FIG. 6, which means comprise some common members as will be described hereinbelow. The apparatus also comprises means not shown for positioning and guiding the members to provide the relationships described hereinafter, means for regulating the temperatures of various members as hereinafter described, and means for controlling blow-molding gas as set forth hereinbelow.

Figure 3:
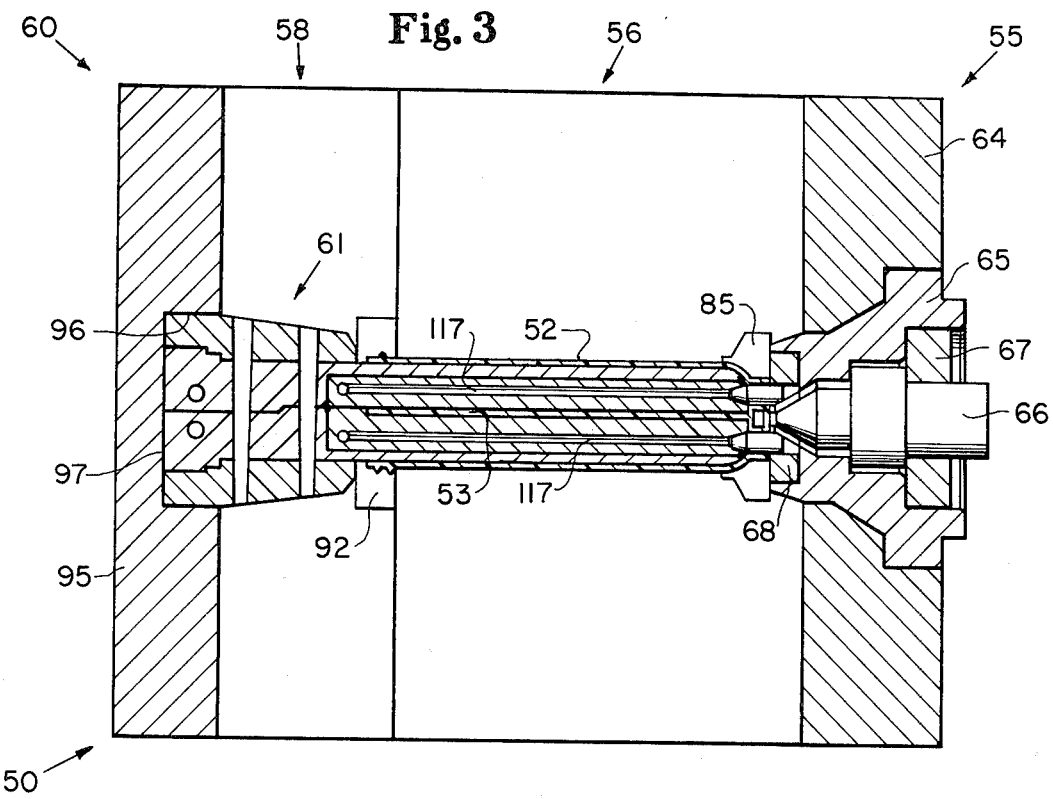

Briefly, as shown sequentially in FIGS. 2 through 8 inclusive, a preform 52 of the configuration shown in FIG. 17 is injection molded, FIG. 3, and then, after apparatus members have been repositioned, the exterior wall of the preform 52 is blow molded, FIG. 7, to provide a finished container 54, FIG. 13, while the chordal bulkhead 53 of the preform 52 is constrained or confined between blow mold members to substantially obviate changing the size, shape, or orientation of the bulkhead 53.

In order to reduce the chance of obscuring the present invention, some of the means for positioning, aligning, cooling and controlling the several members of the disclosed apparatuses are not shown in the figures. It is believed, however, in view of the present disclosure, that providing suitable reciprocating or turret type positioning and aligning means, and suitable cooling and control means and the like is within the skill range of persons having ordinary skill in the art.

Referring now to FIG. 1, the injection molding means 50 comprises an injection head assembly 55, two injection molding body cavity halves 56, 57, two neck cavity halves 58, 59, and a butt plate assembly 60. The butt plate assembly 60, FIG. 2, comprises a bifurcated, cantilevered mandrel 61. Together, all of these members of the injection molding means 50 define a preform cavity 62, FIG. 2.

The injection head assembly 55, FIG. 2, comprises a plate 64, nozzle adapter 65, injection nozzle 66, nozzle retainer 67, a pin support plate 68, and two pins 69, 70. These members of injection head assembly 55 are rigidly secured together by means which are not shown in order to obviate obscuring functional details of the members.

Plate 64 is provided with a receptacle 73 which is configured to receive a nozzle adapter 65 so that a variety of commercially available thermoplastic injection nozzles 66 can be accommodated in the assembly 55 by merely providing custom fit nozzle adapters 65 and nozzle retainers 67 rather than having to provide a whole new plate 64 for each injection nozzle geometry of interest.

Nozzle adapter 65 has a cavity 74 machined in it to receive injection nozzle 66, and nozzle retainer 67. Nozzle adapter 65 is also machined to receive pin support plate 68 and to have the pin support plate 68 rigidly secured therein.

Injection nozzle 66 of the preferred embodiment apparatus is an electrically heated nozzle such as the Model 3100 series of Hot Tip Bushings available from the Incoe Corporation, Troy, Mich. Such nozzles or bushings couple a thermoplastic injection press to an injection mold assembly so that thermoplastic material is continuously maintained in a hot, flowable state up to the part cavity or mold runner as hereinafter described. This shortens the apparatus cycles and promotes clean separation of the part upon completion of the injection molding sequence.

Nozzle retainer 67 is provided to rigidly secure injection nozzle 66 in plate 65.

Figure 4:
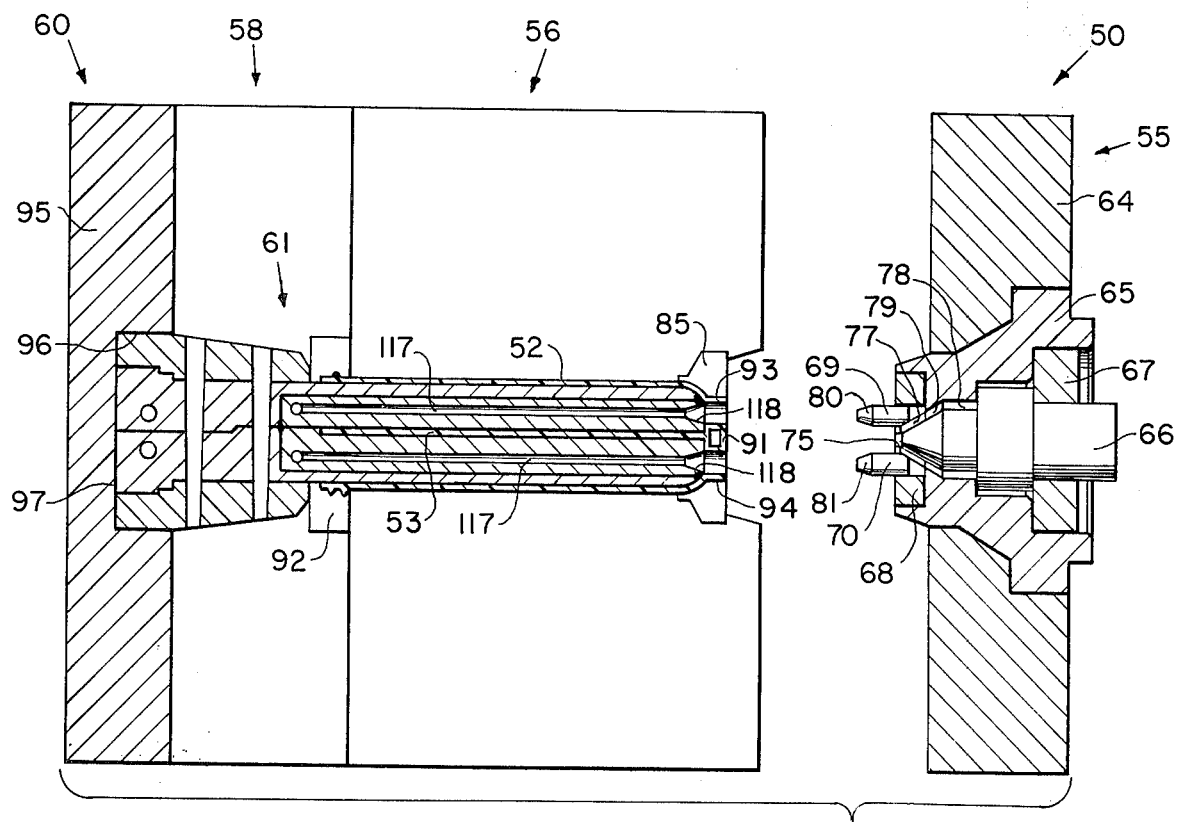

Pin support plate 68, FIGS. 11 and 12, is provided with two holes in which the bases of pins 69, 70 are rigidly secured. Pin support plate 68 is also provided with a centrally disposed, axially extending hole 75, FIG. 12, and a frusto conical recess 76, FIG. 11. The hole 75 is sized to snugly receive the discharge tip of the injection nozzle 66, and the recess 76 is sized to provide an annular, frusto-conical space 77, FIG. 4, adjacent the discharge end portion of the injection nozzle 66. As can be seen in FIG. 4, the cavity 74 in the nozzle adapter 65 also provides an annular shape space adjacent the discharge end of the injection nozzle 66 which space comprises a cylindrical portion 78 and a frusto-conical portion 79. The space 77 and space portions 78, 79 are provided in tandem relation to reduce heat flow from the injection nozzle 66 to enhance the performance of the injection nozzle 66.

Pins 69, 70, FIG. 12, are provided with chamfered distal ends 80, 81 respectively which are configured to fit receptacles provided in the distal ends of the cantilevered bifurcations of the male mold mandrel 61, FIG. 2. The pins 69, 70 serve two functions which will be described in conjunction with describing the mandrel hereinafter. Briefly, however, pins 69, 70 provide lateral structural support for the distal ends of the bifurcations of mandrel 61 and, during the injection molding operation, plug the blow-molding-gas passageways 117, FIG. 2, which extend through the mandrel 61 whereby thermoplastic material is prevented from entering the passageways 117.

Injection molding body cavity halves 56, 57, FIG. 1, are symmetrical front-to-back and, together, define the exterior of the body portion of the preform cavity 62.

For convenience, each injection molding cavity half 56, 57, FIG. 1, comprises an insert 85 one of which inserts 85 is shown in FIG. 2. The inserts 85 enable modifying the configuration of the bottom end of the preform cavity 62 without having to provide whole new injection molding body cavity halves. The inserts 85 are machined so that their vertical faces 86 are in abutting relation when the assembly 50 is closed as shown in FIG. 1.

The inserts 85, FIG. 2, are also machined so that tubular cavities 87, 88 are formed around the cylindrical shanks of pins 69, 70 respectively when the assembly 50 is closed and so that a vertically extending runner passageway 89, FIG. 2, is formed to conduct thermoplastic material introduced through injection nozzle 66 to the tubular cavities 87, 88 and thence to the remainder of the preform cavity 62. The tubular cavities 87, 88, FIG. 2, cause hollow tubular extensions 93, 94, FIG. 17, to be molded on the bottom of each preform 52 to serve a function which is fully described hereinafter.

Neck cavity halves 58, 59, FIG. 1, define the exterior surface of the neck portion 90 of the preform cavity 62. The neck cavity halves 58, 59 are each provided with an insert 92 which, as shown with respect to half 58, FIG. 2, provides means for modifying the neck portion 90 of the preform cavity 62 without having to provide whole new neck cavity halves. In the preferred embodiment apparatus, inserts 92 are configured to provide a threaded neck on preform 52, FIG. 17. Neck cavity halves 58, 59 also comprise means not shown for cooling inserts 92 to facilitate solidifying the neck of an injection molded preform 52 while the exterior wall of the preform is being blow molded.

Butt plate assembly 60, FIG. 2, comprises butt plate 95, and mandrel assembly 61 which assembly is hereinafter referred to as mandrel 61.

Butt plate 95, FIG. 2, comprises means for cantilevering mandrel 61 from it, means not shown for conducting coolant to and from the mandrel 61, and means not shown for conducting blow-molding gas from a regulated source to passageways provided in mandrel 61.

The means for contilevering mandrel 61 from butt plate 95 comprises a longitudinally extending cylindrical cavity 96, FIG. 2, for receiving the base end 97 of mandrel 61, and two transversely extending holes for receiving pins 98, 99 which lock the base end of mandrel 61 in cavity 96.

Mandrel 61, FIGS. 9 and 10, comprises a top bifurcation 101, a bottom bifurcation 102, a split collar 103 comprising a top half 104 and a bottom half 105, and two pins 106, 107. The halves 104, 105 of the split collar 103, and the bifurcations 101, 102, are rigidly secured together in the relation shown in FIG. 9 by pins 106, 107. Each half 104, 105 of split collar 103 has a transversely extending hole 108 provided in it so that the mandrel 61 can be ridigly secured to butt plate 95 by pins 98, 99, FIG. 2, as described above.

The bifurcations 101, 102 of mandrel 61, FIGS. 9 and 10, are configured so that when the mandrel 61 is assembled, FIG. 9, a slot 110 is defined between the bifurcations 101, 102. Slot 110 is the portion of preform cavity 62 in which the bulkhead 53 of the preform 52 is injection molded.

Each bifurcation 101, 102 of mandrel 61, FIG. 10, comprises a shell segment 111 and a core segment 112 which segments 111, 112 are configured to provide longitudinally extending voids 113, 114 in the mandrel when secured together as by welding as shown in FIG. 10. Each bifurcation 111, 112 is provided with coolant conduits 115, 116, and a blow-molding-gas passageway 117 which passageways terminate in receptacles 118 in the distal ends of bifurcations 101, 102. The voids 113, 114 are means for substantially insulating shell segments 111 from the core segments 112 to enable maintaining a higher temperature in the shell segments 111 than in the liquid cooled core segments 112. The temperature differential thus established enables solidifying bulkhead 53 of an injection molded preform 52 while the exterior wall of the preform 52 is being blow molded to its ultimate, bulbous-shape, FIG. 7. The surfaces or faces 121, 122 of the bifurcations 101, 102 which define slot 110 also act to constrain the bulkhead 53 of the injection molded preform 52 from changing size, shape, or orientation while the exterior wall of the preform 52 is being blow molded.

The bifurcations 101, 102 of mandrel 61, FIG. 9, and the shank portions of pins 69, 70 preferably have tapers of about one-half degree to provide mold drafts for enabling the release and withdrawal of the mandrel 61 from a finished container, and the pins from the tubular extensions 93, 94, FIG. 4, on an injection molded preform 52, respectively. Thus, bulkhead 53 of the preferred embodiment container 54, FIG. 13, has a width W, FIG. 15, which is progressively narrower from the top end of the bulkhead 53 to its bottom end, and the bulkhead has a thickness T, FIG. 16, which is progressively greater from the top end of the bulkhead to its bottom end. However, because some thermoplastic materials have high shrinkage factors and/or substantial elasticity, it is not believed that these thickness and width relationships are critical to the present invention.

Referring now to FIG. 6, the blow molding means 51 comprises neck cavity halves 58, 59, butt plate assembly 60, and two blow molding body cavity halves 131, 132. The cavity halves 131, 132 include means for pinching-off the tubular extensions 93, 94 on preform 52 so that the bottom of the finished container 54, FIG. 13, is closed.

As stated hereinbefore, the blow molding means 51 comprises some members common to injection molding means 50, FIG. 1. The common members comprise neck cavity halves 58, 59, and butt plate assembly 60.

The blow molding body cavity halves 131, 132 are symmetrical from front-to-back. Therefore, only the rear half 131, FIG. 6a, will be described.

The rear blow molding body cavity half 131, FIG. 6a, includes an insert 133 secured therein. Body cavity half 131 is machined so that, when fitted with an insert 133, two cavities are formed which are separated by a pinch-off knife 135 having a parting edge 135 disposed in the plane of the co-planar abutment surfaces 136. The bulbous-shape cavity disposed to the left of parting edge 135 is designated body cavity 137, and the cavity disposed between the left face 138 of insert 133 and pinch-off knife 134 is designated waste cavity 139.

A detail of body cavity 137 of body half 131 that is not visible in FIG. 6a is a longitudinally extending V-shape ridge. Such a ridge is visible in FIG. 26 and is identified therein as ridge 200. Such ridges are provided in both cavity halves 131, 132 so that they abut the preform 52 adjacent the side edges 141, 142, FIG. 19, of bulkhead 53 of preform 52. Thus, the ridges, acting in concert with the slot-defining faces 121, 122 of mandrel 61, comprise means for constraining or confining the bulkhead 53 from substantially changing its size, shape, or orientation while the body portion of the preform is blow molded to convert the preform 52 into a container 54, FIG. 7. It is these ridges that precipitate the V-shape, longitudinally extending notches or grooves 143, 144 in container 54, FIGS. 13 and 14. The intersection of notch 143 with the bottom of container 54 is also visible in FIG. 8.

The blow molding body cavity halves 131, 132 are also cooled sufficiently to induce solidification of thermoplastic material which is caused to contact their surfaces as hereinafter described.

The operation of the preferred embodiment integrated injection-blow molding apparatus is shown in FIGS. 1 through 8 inclusive.

With the injection molding members associated in abutting relation as shown in FIGS. 1 and 2, thermoplastic material is forced into the preform cavity 62 from a suitable thermoplastic injection means or press through injection nozzle 66 to form an injection molded preform 52, FIG. 3.

As shown in FIG. 4, the injection head assembly is then spaced longitudinally (by means not shown) from the residual members of the injection molding apparatus, to wit: the injection molding body cavity halves 56, 57; the neck cavity halves 58, 59; and the butt plate assembly 60. This spacing parts the preform 52 from the thermoplastic material in the nozzle 66 at the juncture of hole 75 with runner 91, and withdraws pins 69, 70 from the tubular extensions 93, 94 on preform 52 and from receptacles 118 in mandrel 61.

The injection molding body cavity halves 56, 57 are then spaced by means not shown from the remainder of the injection molding apparatus to provide the configuration of FIG. 5 so that the blow molding body cavity halves 131, 132 can be associated therewith as shown in FIG. 6.

Closing of the blow molding body cavity halves 131, 132 about the preform 52 to provide the blow molding means configuration 51 shown in FIG. 6 causes the parting edges 135 to pinch-off the bulk of the tubular extensions 93, 94 whereby the tubular extensions 93, 94 and the runner 91 are severed in mass from the remainder of preform 52. This pinching-off closes the holes 147, 148, FIGS. 18 and 20, through the tubular extensions 93, 94, respectively, whereby the bottom of the ultimate container 54 is closed. The severed portions of tubular extensions 93, 94 and runner 91 remain in waste cavity 139, FIG. 6a, until the blow molding body cavity halves 131, 132 are subsequently parted.

After the blow molding body cavity halves have been closed about the preform 52 to provide the blow molding means configuration 51, FIG. 6, pressurized blow-molding gas is admitted from a regulated source through conduits not shown in butt assembly 60 and thence through passageways 117 in mandrel 61 whereby the body 146 of the preform is expanded or blown, FIG. 7, to the configuration of the body cavities 137 of the blow mold body cavity halves 131, 132. Upon contacting the cooled body cavity halves 131, 132, the thermoplastic freezes or solidifies.

Because neck cavity halves 58, 59 including inserts 92, FIG. 3, and the core segments 112, FIG. 10, of mandrel 61 are cooled sufficiently as by circulating coolant through passageways 115, 116, FIG. 10, of mandrel 61, the bulkhead 53 and the neck 145 of preform 52 solidify while the apparatus is converted from the injection molding configuration, FIG. 3, to the blow molding configuration, FIG. 6a, and while the body 146 of the preform 52 is blow molded to its ultimate bulbous-shape, FIG. 7, and while container 54 is prepared for removal from the apparatus by displacing the neck cavity halves 58, 59 and the blow molding body cavity halves 131, 132 therefrom.

Thus, the conversion of a preform 52 into a bulbous-shape container 54, FIG. 8, is completed and the container 54 can be stripped from mandrel 61 by a suitable stripping means not shown. As stated hereinbefore, bulkhead 53 is constrained or confined by faces 121, 122 and by the ridges and other portions of the blow molding body cavity halves from substantially changing its size, shape, or orientation while the body portion of preform 52 is blow molded to its ultimate bulbous-shape.

Upon stripping the blow molded container 54, FIG. 8, from mandrel 61, the mold members are repositioned by means not shown to the configuration shown in FIG. 1 to form blow molding means 50 whereupon the cycle can be repeated.

ALTERNATE EMBODIMENT APPARATUS

Figure 21:
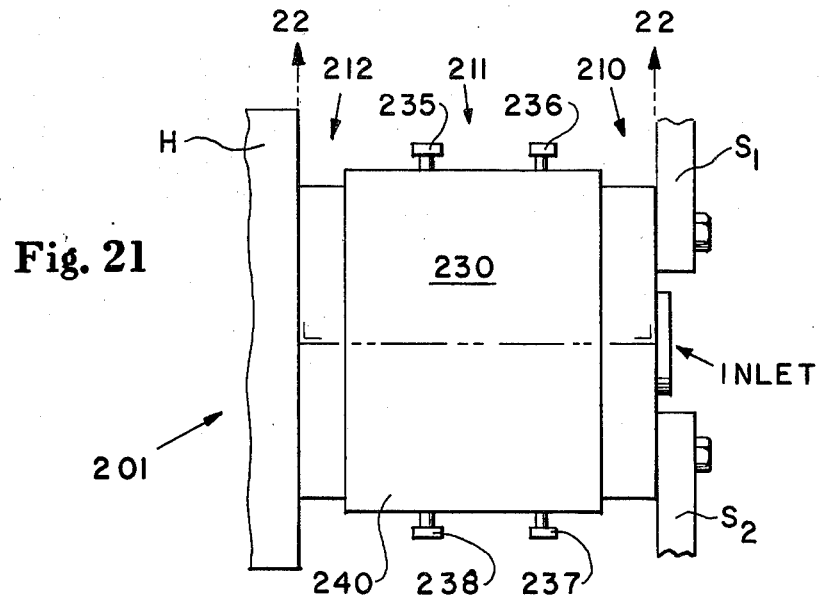
FIG. 21 is a somewhat schematic top view of a fully closed, discrete injection molding apparatus suitable for making preforms of the configuration shown in FIG. 17.

An alternate embodiment apparatus for making precisely partitioned bulbous-shape containers 54, FIG. 13, from thermoplastic materials comprises a discrete injection molding apparatus 201, FIG. 21, and a discrete blow molding apparatus 202, FIG. 26.

Briefly, preforms 52, FIG. 17, are injection molded in apparatus 201, FIG. 21, and the preforms 52 are converted into containers 54, FIG. 13, in apparatus 202. The injection molding apparatus 201 comprises means for injection molding preform 52 so that it comprises an integral bulkhead 53 of the size, shape, and orientation required in container 54, and the blow molding apparatus 202, FIG. 26, comprises means for constraining or confining the bulkhead 53 to substantially obviate its changing size, shape, or orientation while the body portion of the preform is blow molded to convert the preform into a container 54.

Yet another alternative, is using blow molding apparatus 202, FIG. 26, to convert longitudinally partitioned extruded preforms 203, FIGS. 38, 39, having untapered bulkheads 53a into containers like container 54, FIG. 13, but for having untapered bulkheads 53a instead of bulkheads 53 which are preferably tapered as hereinbefore described.

INJECTION MOLDING APPARATUS

A preferred embodiment discrete injection molding apparatus 201, FIG. 21, for making preforms 52, FIG. 17, comprises a head assembly 210, a cavity assembly 211, and a butt assembly 212. The head, cavity, and butt assemblies are linked together and installed in an injection molding press comprising stationary members $S_1$, $S_2$, a movable head H, means not shown for moving H to close and open the apparatus 210, and means not shown for heating and injecting thermoplastic material into the mold assembly 201.

Figure 24:
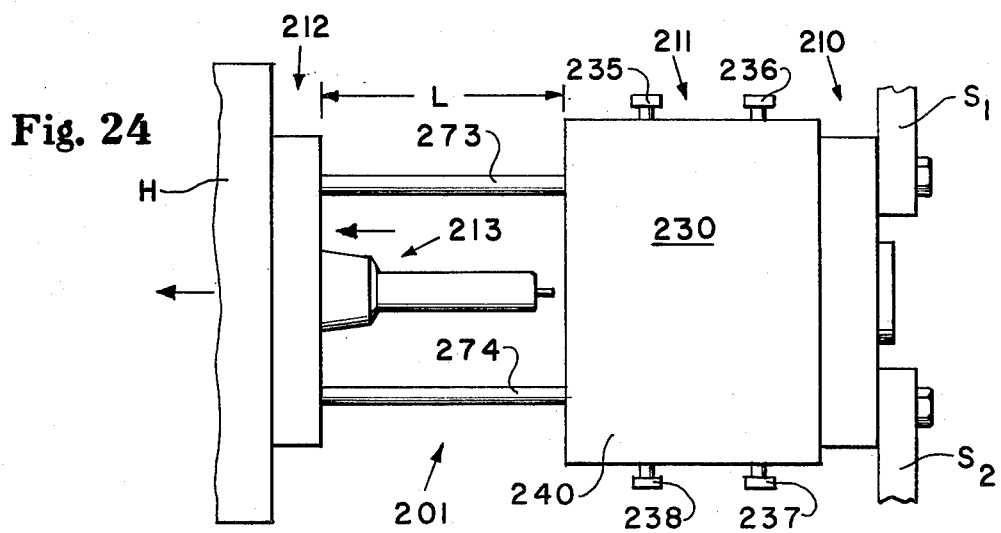
FIG. 24 is a somewhat schematic top view of the injection mold assembly shown in FIG. 21 after the butt plate assembly has been spaced leftwardly to withdraw the mandrel from inside the injection molded preform disposed in the injection mold body.

Briefly, the injection molding apparatus 201 is closed, FIG. 21, while a preform 52, FIG. 17, is molded; then the butt assembly 212 is moved leftwardly as shown in FIG. 24 by H to withdraw a male mold mandrel 213 from the preform 52 within cavity assembly 211, and then the cavity assembly 211 and the butt assembly 212 are simultaneously moved leftwardly by H to the position shown in FIG. 12 to open the cavity assembly 211 so that the molded preform 52 can fall out of the molding apparatus 201 into a receiving bin or the like.

Figure 22:
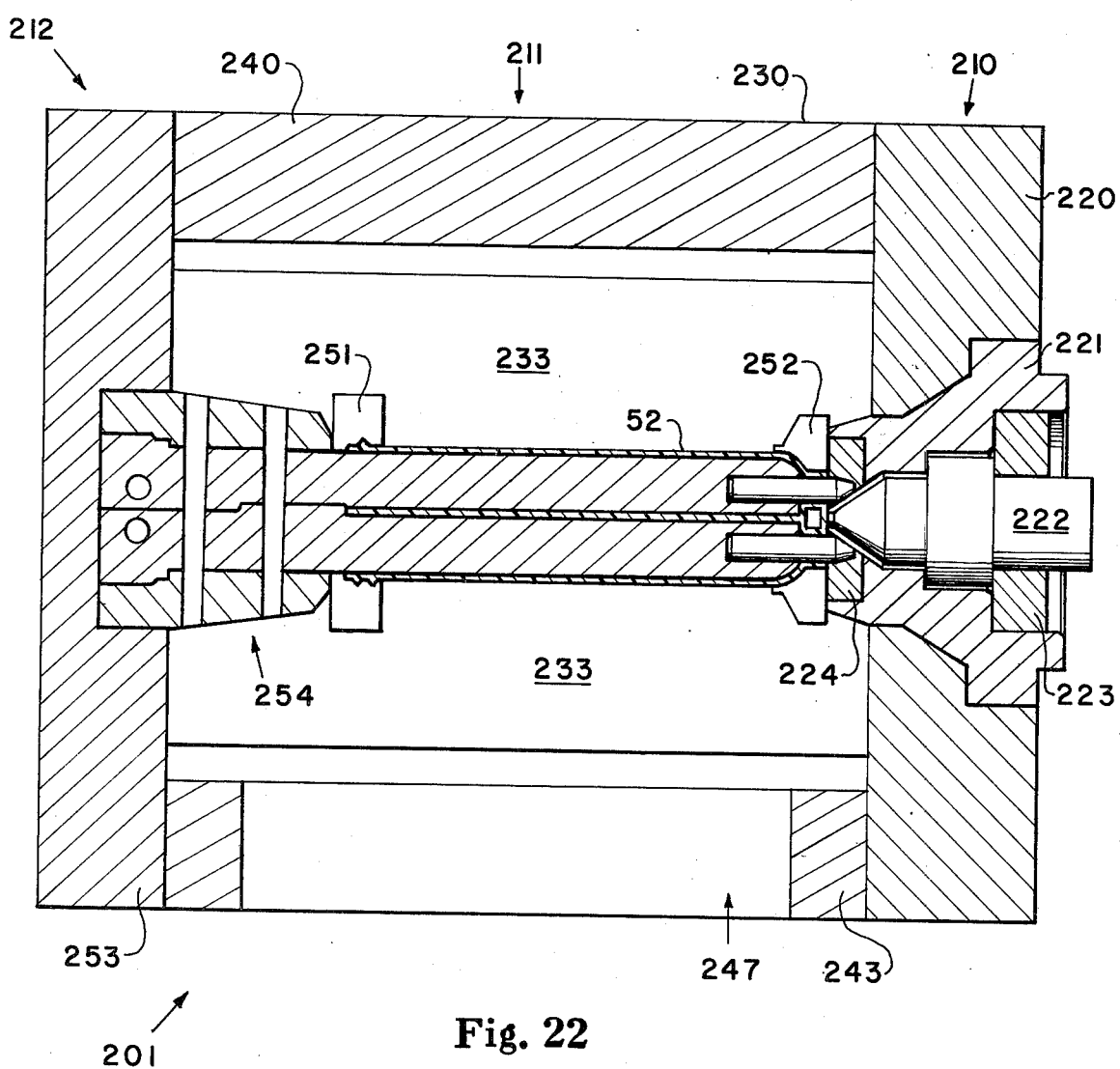
FIG. 22 is a side elevational sectional view of the injection molding apparatus of FIG. 21 taken along line 22—22 thereof and having an injection molded preform disposed therein.

Head assembly 210, FIG. 22, comprises a plate 220, nozzle adapter 221, injection nozzle 222, nozzle retainer 223, pin receiving plate 224, and means not shown for securing the members together as indicated. But for the following differences, the members of the head assembly 210 are substantially identical to the corresponding members of the injection head assembly 55 of the preferred injection molding means 50, FIG. 2, described hereinbefore.

Plate 220, FIG. 22, is different from plate 64, FIG. 2, inasmuch as camming slots 225 are machined in plate 220, FIG. 25, for a purpose described hereinbelow.

Pin receiving plate 224, FIG. 22, is different from pin support plate 68, FIG. 2, inasmuch as pin receiving plate 220, FIG. 22, is provided with receptacles for receiving the distal ends of pins 226, 227 which pins are rigidly secured in the distal ends of the bifurcations of mandrel 213 whereas the bases of pins 69, 70, FIG. 2, are rigidly secured in pin support plate 68. Both arrangements provide, however, lateral support for the otherwise cantilevered bifurcations of their respective male mold mandrels so that the bifurcations are not displaced or distorted by unevenly distributed fluid pressures which may be incident to injection molding of thermoplastic materials.

Figure 25:
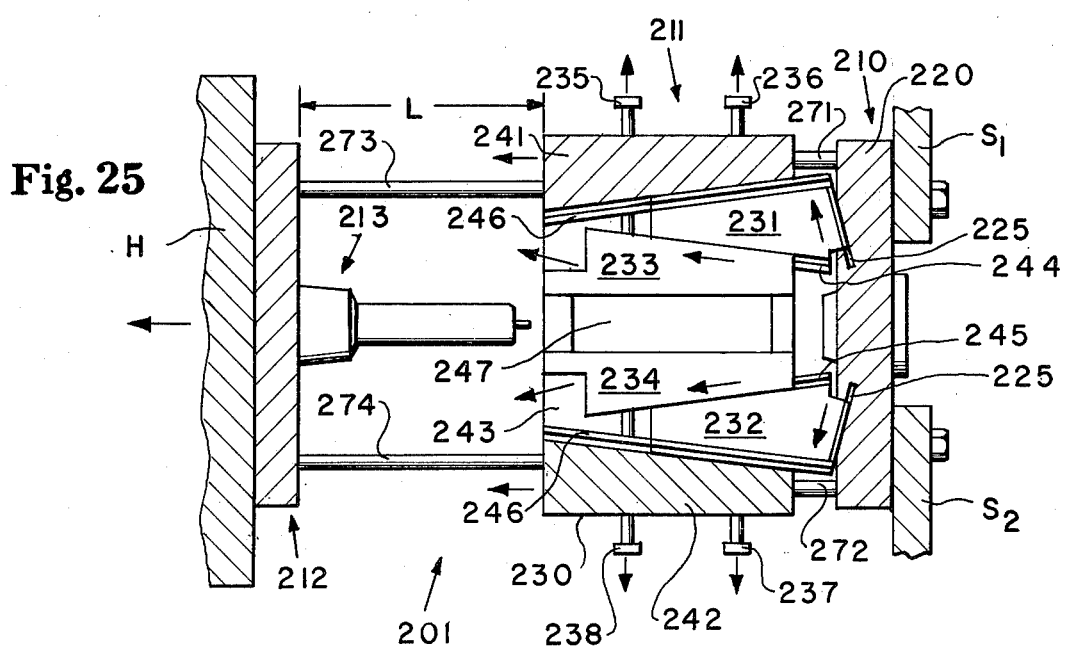
FIG. 25 is a fragmentary, somewhat schematic top view of the injection mold apparatus of FIG. 24 after the injection mold body cavity halves have been spaced transversely apart, and longitudinally spaced from the injection head assembly.

Cavity assembly 211, FIG. 25, comprises a frame 230, two trapezoidal-shape camming blocks 231, 232, two body cavity halves 233, 234, and transverse guides 235–238 inclusive. The camming blocks 231 and 232 are alike, and the body cavity halves are symmetrical from front-to-back; that is, about a vertical plane in which the longitudinal centerline of the apparatus extends.

Briefly, the body cavity halves 233, 234, FIG. 25, are secured to transverse guides 235–238 inclusive which slidingly extend through side walls 241, 242 of frame 230 so that the body cavity halves can move transversely with respect to frame 230. The body cavity halves 233, 234 are slidingly engaged with camming blocks 231, 232 via tracks 244, 245, and the camming blocks 231, 232 are slidingly engaged with frame 230 and plate 220 via tracks 246 and slots 225 respectively. The angular relationships of the slots 225 and the tracks 244, 245, 246, in conjunction with camming blocks 231, 232, provide means for transversely spacing body cavity halves as a function of spacing frame 230 longitudinally from plate 220. Also, these relationships and components enable this spacing function to be at an apparent camming angle which is nearly the sum of the acute angles between tracks 246 and the longitudinal centerline of the apparatus, and the acute angles between tracks 244, 245 and the longitudinal centerline of the apparatus as viewed in FIG. 25. For instance, in the preferred embodiment, each above angle is 7° and provides an effective camming angle of nearly 28° for spacing body cavity halves 233, 234 transversely as a function of spacing frame 230 longitudinally from plate 220. Such camming means has been found to be very useful in injecting molding presses having limited available longitudinal strokes.

Frame 230 comprises top wall 240, FIGS. 21 and 24, side walls 241, 242, FIG. 25, and bottom wall 243, FIG. 25. Bottom wall 243, FIGS. 22, 23 is provided with an aperture 247 through which a completed preform 52 falls when the injection molding apparatus 201 is opened as shown in FIG. 25.

Referring now to FIG. 22, body cavity half 233 is shown to comprise a neck insert 251 and a bottom insert 252. The inserts 251, 252 are provided in both body cavity halves 233, 234 so that the external configurations of the neck and the bottom of the preform 52 can be modified without providing whole new body cavity halves. As is apparent from FIG. 22, the body cavity halves 233, 234 are machined to define the external surface of the preform 52.

Butt assembly 212 comprises a butt plate 253 and a mandrel assembly 254 and is assembled in the manner of and for the purpose of butt plate assembly 60, FIG. 2, of the integrated injection-blow molding apparatus described hereinbefore. That is, the mandrel 254, FIG. 22, is cantilevered from butt plate 253 so that the mandrel can be telescoped between the body cavity halves 233, 234 of the cavity assembly 211 to define the interior of the preform 52.

Figure 23:
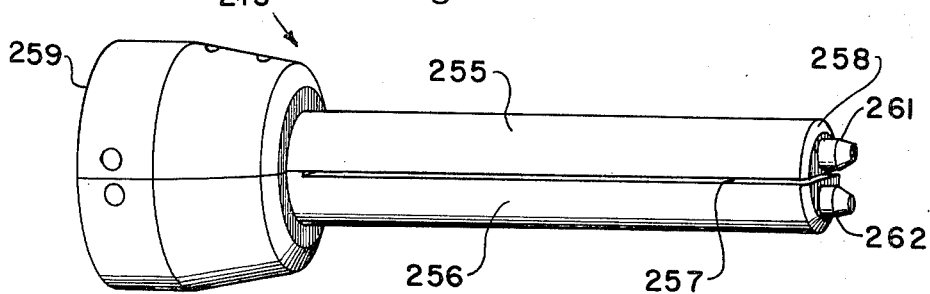
FIG. 23 is a perspective view of the bifurcated male mandrel of the injection molding apparatus shown in FIG. 22.

Mandrel 254, FIG. 23, comprises a top bifurcation 255 and a bottom bifurcation 256 which are disposed to define a slot 257 therebetween. The slot 257 extends longitudinally from the distal end 258 of the mandrel towards the proximal end 259 of the mandrel. The slot 257 is defined intermediate spaced faces of the bifurcations which are so spaced and configured that the bulkhead 53 of the preform 52 will be formed in the slot.

The bifurcations 255, 256 of mandrel 254 are provided with pins 261, 262, respectively, which pins extend longitudinally from the distal ends of the bifurcations. The pins 261, 262 are provided with chamfered distal ends and substantially cylindrical shanks. The distal ends of the pins 261, 262 are configured to seat in the receptacles provided in the pin receiving plate 224 described hereinbefore. Thus, the pins 261, 262 provide lateral support for the distal ends of the bifurcations 255, 256 of mandrel 254 as described hereinbefore.

The substantially cylindrical shanks of pins 261, 262 have clearance fits between inserts 252 so that integral tubular extensions 93, 94 are molded on preform 52. Preferably, the shanks are provided with slight tapers or drafts to facilitate withdrawing the pins 261, 262 from inside the tubular extensions 94, 94.

As stated hereinbefore, the tubular extensions provide material which, when the preform is subsequently blow molded, can be pinched-off to close the holes 147, 148, FIGS. 18 and 20, in the bottom of the preform 52.

While it has been determined that the distal ends of male mold mandrel members having relatively high slenderness ratios require lateral support to prevent distortion or displacement of such distal ends due to uneven injection molding pressure distribution, the pins 261, 262 can be omitted from apparatus wherein the cantilever strength of such male mold members is sufficient to substantially obviate their distortion or displacement by injection molding pressures. In this event, of course, the bottom of the preform is closed and no pinch-off operation on the preform is required.

The injection molding apparatus 201, FIG. 25, further comprises guides 271, 272, and rods 273, 274. The guides 271, 272 extend leftwardly in parallel relationship from the head assembly 210 and have the cavity assembly 211 slidingly engaged thereon. Rods 273, 274 extend rightwardly in parallel relationship from the butt assembly 212 into the cavity assembly. The distal (right-hand) ends of rods 273, 274 are so configured and engaged with respect to holes provided in the cavity assembly that moving the butt assembly 212 leftwardly (by moving head H) from the closed position, FIG. 21, a distance L, FIG. 24, spaces the butt assembly the distance L from the cavity assembly. Further leftward movement of the butt assembly 212, FIG. 25, causes the cavity assembly 211 to be spaced from the head assembly 210.

The injection molding apparatus 201, FIG. 21, is also provided with means not shown for controlling the temperature of the body cavity halves 233, 234 (including inserts 251, 252) and the bifurcations 255, 256 of mandrel 254 at a sufficiently high temperature to enable injection of heated and pressurized thermoplastic into the apparatus to form a preform 52 therein, and to then cool the thermoplastic to a sufficiently low temperature to solidify the thermoplastic material so that the completed preform 52 can be released and removed therefrom.

In operation, a preform 52, FIG. 17, is injection molded when the injection molding apparatus 201 is closed, FIGS. 21, 22. Then, the mandrel 254 is withdrawn from the preform by moving head H leftwardly a distance L. The preform is then parted from the nozzle and is dropped through aperture 247 into a bin or into a suitable take away means upon sufficient further leftward movement of head H, FIG. 25. Head H is then moved rightwardly to close the apparatus as shown in FIG. 21 whereupon a new injection molding cycle can begin.

BLOW MOLDING APPARATUS

Figure 37:
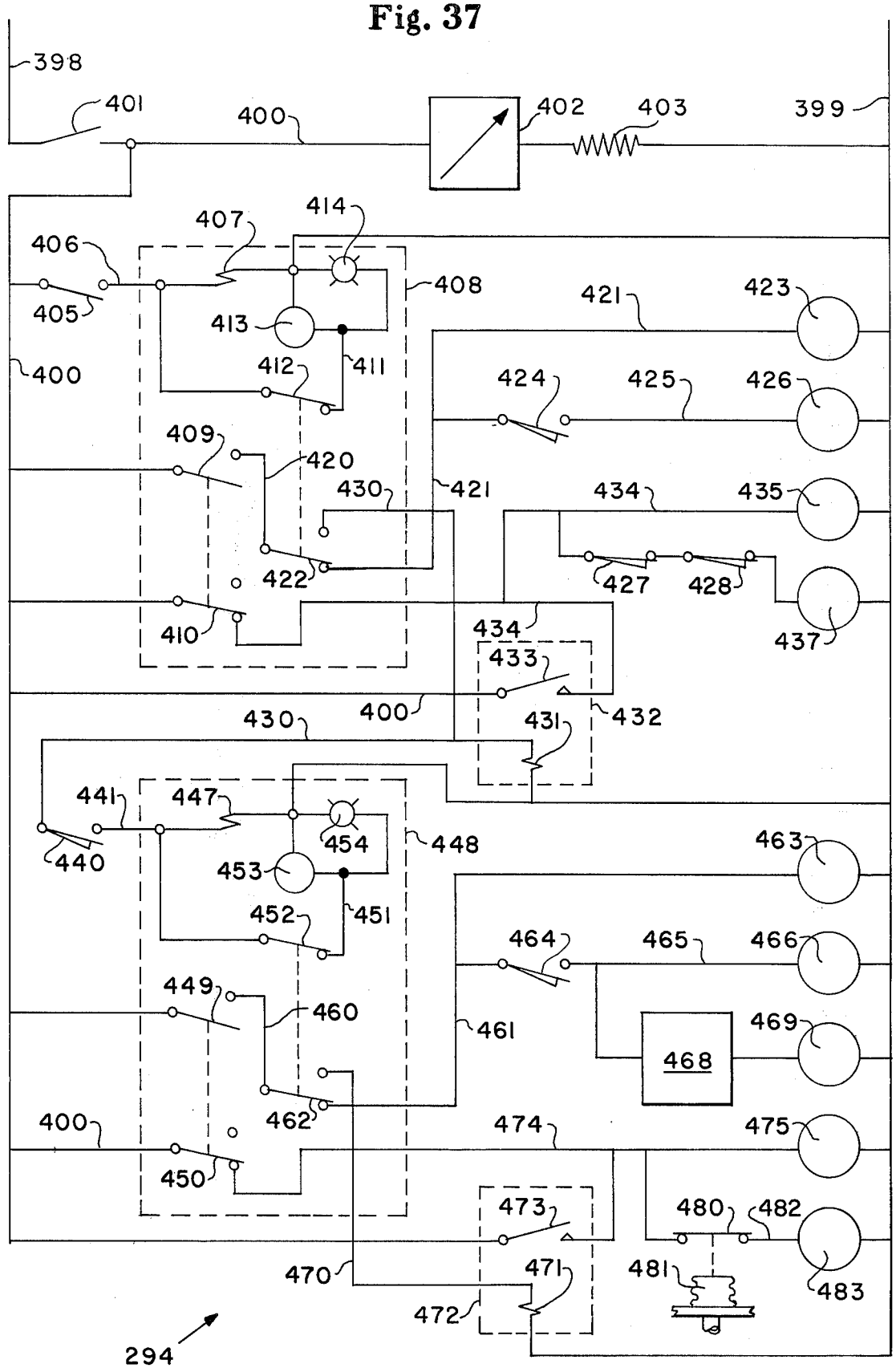
FIG. 37 is an electrical schematic of the control system for the blow molding apparatus shown in FIG. 26 to provide the sequence illustrated in FIGS. 27, and 29 through 34 inclusive.

The preferred embodiment discrete blow molding apparatus 202, FIG. 26, comprises: a frame 280, guides 281, 282, a support member or mandrel 283; an actuator 284 for operating the mandrel 283 between a DOWN position, FIG. 26, and an UP position, FIG. 29; a heater 285, neck protection halves 286, 287; actuators 288, 289 for operating the neck protection halves 286, 287 between an OPEN position, FIG. 29, and a CLOSED position, FIG. 30; blow molding body cavity halves 291, 292; means 293 for operating the body cavity halves 291, 292 between an OPEN position, FIG. 26, and a CLOSED position, FIG. 31; and control means 294 shown schematically in FIG. 37 for controlling a cycle of the apparatus.

Briefly, a preform 52, FIG. 17, is installed, FIG. 27, with its open end down on a liquid cooled, bifurcated support member or mandrel 283. The mandrel 283 is then elevated, FIG. 29, to telescope the preform 52 into a heater 285 for a predetermined first inteveral to heat the body portion 146 of the preform to a sufficiently high temperature to enable blow molding it to the bulbous-shape configuration of containers 54, FIG. 33. While the preform 52 is disposed in the heater, FIG. 29, the neck 145 and bulkhead 53 of the preform 52 are maintained at sufficiently low temperatures by liquid cooled neck protection halves 286, 287 and the liquid cooled mandrel 285, respectively, to substantially obviate their changing size, shape, or orientation while the body portion 146 of the preform 52 is blow molded. After being heated sufficiently, the mandrel 283 is lowered to index the pre-heated preform intermediate blow molding body cavity halves 291, 292. The body cavity halves 291, 292 are then closed together, FIG. 31, and pressurized blow-molding gas is admitted into the preform 52 to blow mold its body 146 to the configuration shown in FIG. 33. Means are also provided for constraining or confining the bulkhead 53 of the preform 52 from substantially changing size, shape, or orientation while the body portion 146 of the preform is being blow molded.

Mandrel 283, FIGS. 26, 28, 32 and 33, comprise two bifurcations 301, 302, a base 303, a gas injection collar 304, blow-molding gas inlet conduit 305, coolant passageways 307, 308, chordal dividers 309, 310 for coolant passageways 307, 308 respectively, and coolant inlet and outlet conduits 311, 312 respectively. The gas injection collar 304 has a substantially annular discharge orifice 314, FIG. 33, which is connected via internal passageways not shown to the blow-molding gas inlet conduit 305, FIG. 31, whereby the control means 294 causes blow-molding gas to enter the space intermediate the mandrel 283 and the exterior wall or body portion 53 of the preform 52 whereupon the preform 52 is converted into a container 54, FIG. 33.

As stated hereinbefore with respect to the blow molding body cavity halves 131, 132, FIGS. 6a and 7, of the integrated injection-blow molding apparatus, a ridge 200, FIGS. 26, is provided in each molding body cavity half 291, 292. As shown in FIG. 26, ridge 200 has a vertically extending distal edge 320 which, when the body cavity halves 291, 292 are closed about a preform 52, abuts the preform adjacent a vertically extending edge of the bulkhead 53 of the preform 52. The two edges 320, one in each blow mold body cavity half 291, 292, act in concert with the faces 315, 316 of the bifurcations 301, 302 respectively which define the slot in mandrel 283, FIG. 27, to constrain or confine the bulkhead 53 as shown in FIG. 28 from substantially changing size, shape, or orientation during the blow molding operation.

The body cavity halves 291, 292 comprise pinch-off knives 134, FIG. 26, and waste cavities 139 substantially identical to the corresponding features provided in the preferred blow molding means 51, FIG. 6a, for pinching-off the tubular extensions 93, 94 on a preform 52 to close the holes 147, 148 therein.

The blow molding apparatus 202, FIG. 26, is controlled by control means 294, FIG. 37, which comprises wires, timers, switches and valves which will be designated and described in conjunction with describing a cycle of the controller/apparatus.

Power is applied to wire 400, FIG. 37, from mains supply wire 398 by closing switch 401. This applies power through an adjustable autotransformer 402 to the heating element 403 of heater 285, FIG. 26, and thence to the mains return wire 399. The adjustable autotransformer 402 enables controlling the temperature of the heater 285 manually to sufficiently heat a preform 52 during a predetermined first interval to enable subsequent blow molding of the body portion of a preform 52.

A cycle of the blow molding apparatus 202, FIG. 26, is begun by closing switch 405, FIG. 37, after placing a preform 52 on the mandrel 283, FIG. 27, while the members of the apparatus are disposed as shown in FIGS. 26 and 27: mandrel 285 DOWN; body cavity halves 291, 292 OPEN; and neck protection halves 286, 287 OPEN; and heater 285 stabilized.

The closing of switch 405, FIG. 37, applies power to wire 406 which energizes clutch 407 of timer 408, the preform heating interval timer. Clutch 407 causes switch 409 to close and switch 410 to open.

Timer 408 in the controller for apparatus 202 is a Series HZ 170A6 Cycle-Flex timer which is available from Eagle Signal, Davenport, Iowa.

Applying power to wire 406 also applies power to wire 411 through switch 412 which is closed. This energizes the timer motor 413 and the indicator light 414. The timer thus begins to time a predetermined first interval.

Virtually concurrently with starting the motor 413 of timer 408, power is applied through switch 409 to wire 420, and thence to wire 421 through a timer motor operated switch 422. This energizes a solenoid valve 423 which ports pressurized air to actuator 284, FIG. 27, whereupon the mandrel 283 with the preform 52 thereon is elevated to its UP position within heater 285, FIG. 29.

When the mandrel 283 reaches its UP position, FIG. 29, it closed a limit switch not shown in FIG. 29 which is designated the mandrel UP switch 424, FIG. 37. This applies power to wire 425 which energizes solenoid valve 426. Solenoid valve 426 ports pressurized air to actuators 288, 289 which actuators close the neck protection halves 286, 287 about the neck of the preform 52 as shown in FIG. 30. As stated hereinbefore, the neck protection halves 286, 287 are cooled by means not shown to prevent heating the neck of the preform 52 while the preform is disposed in heater 285. While the neck protection halves 286, 287 are closed, their OPEN limit switches 427, 428, FIG. 37, are open.

Upon completion of the predetermined first interval, the motor 413 of timer 408 reverses the position of switch 422 which removes power from wire 421, solenoid valve 423, wire 425, and solenoid valve 426; and applied power to wire 430.

Power on wire 430, FIG. 37, energizes coil 431 of relay 432 which closes its normally open contact 433. The closure of contact 433 applies power from wire 400 to wire 434 which energizes solenoid valve 435. When solenoid valve 435 is energized, it ports pressurized air to actuators 288, 289 which then open the neck protection halves 286, 287. When the neck protection halves 286, 287 reach their OPEN positions they close limit switches 427, 428 respectively. Thus, because limit switches 427, 428 are series connected, power is applied to wire 436 which energizes solenoid valve 437.

When solenoid valve 437, FIG. 37, is energized, it ports pressurized air to actuator 284, FIG. 26, which causes the mandrel 283 to be lowered to its DOWN position where it is indexed intermediate the blow molding body cavity halves 291, 292. When the mandrel 283 arrives at its DOWN position, limit switch 440 is closed which applies power from wire 430 to wire 441.

In the meantime, the switch 412 in timer 408 is opened which de-energizes the motor 413 and indicator light 414 of the timer. Timer 408 then "rests" in the timed out condition with its clutch 407 energized and its switches 409, 410, 412, and 422 all disposed oppositely from their positions shown in FIG. 37 until switch 405 is manually opened. Note: Switch 405 is not opened until after the entire cycle of the blow molding apparatus 202 is completed.

Upon applying power to wire 441, FIG. 37, as stated above, clutch 447 of timer 448 is energized which operates switches 449, 450. Power is simultaneously conducted through switch 452 to wire 451 whereby motor 453 begins to run and indicator light 454 is energized to indicate that the predetermined second interval to be timed by timer 448 has begun.

The timer 448 is the blow molding interval timer and is identical to timer 408, the preform heating interval timer, which was described hereinbefore.

When switch 449, FIG. 37, is operated by clutch 447 of timer 448 as stated above, power is applied from wire 400 to wire 460 across switch 449. Power is thence conducted across switch 462 to wire 461 which energizes solenoid valve 463.

When solenoid valve 463 is energized, pressurized air is ported to the operating means 293, FIG. 26, to close the body cavity halves 291, 292 as indicated in FIG. 31. This closes limit switch 464, FIG. 26, which applies power to wire 465, FIG. 37, which immediately energizes solenoid valve 466. In turn, solenoid valve 466 ports low pressure blow molding gas to the gas inlet conduit 305, FIG. 31, and thence into the preform 52 disposed intermediate the closed body cavity halves 291, 292.

Applying power to wire 465, FIG. 37, also energizes a time delay relay 468 which, after a predetermined time delay, energizes solenoid valve 469. This ports high pressure blow molding gas to the gas inlet conduit 305, FIG. 31, and thence into the preform 52 in the manner described above.

Figure 32:
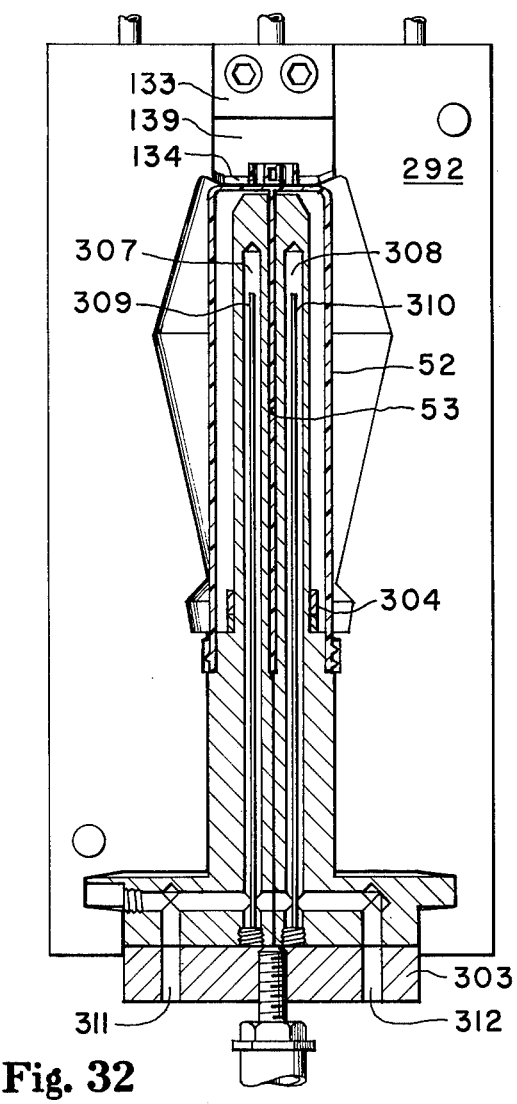
FIG. 32 is a fragmentary sectional side elevational view of the injection molding apparatus of FIG. 31 taken along line 32—32 thereof prior to blow molding the heated preform.
Figure 33:
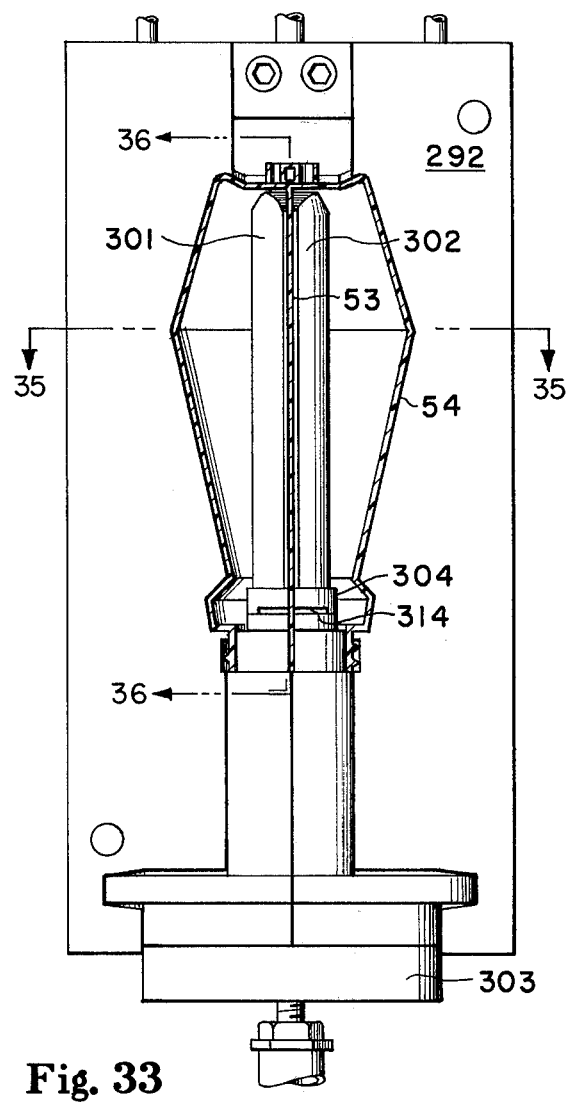
FIG. 33 is a fragmentary side elevational view of the injection molding apparatus after the heated preform shown in FIG. 32 has been blow molded to the ultimate bulbous-shape container having the configuration shown in FIG. 13.
Figure 35:
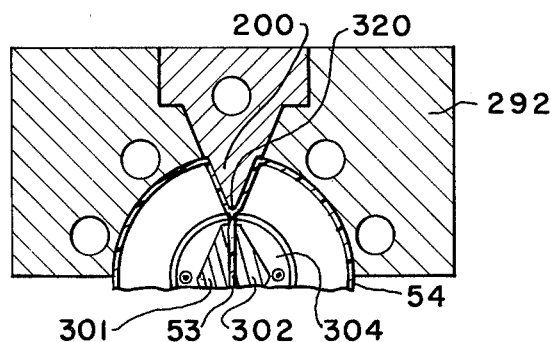
FIG. 35 is a transverse sectional view of the blow molding body cavity half of FIG. 33 taken along line 35—35 thereof.
Figure 36:
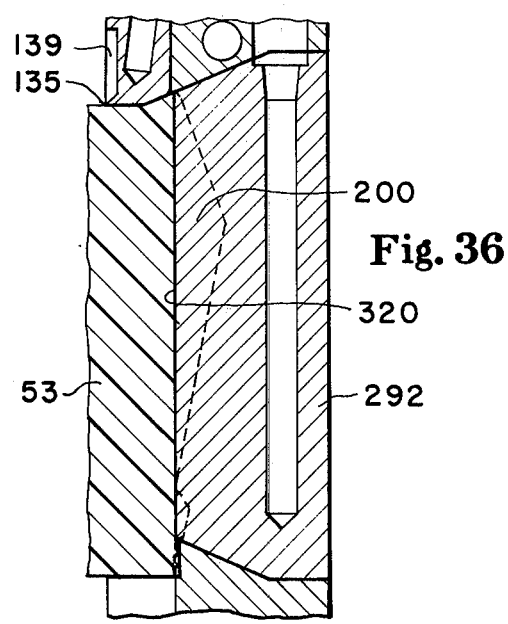
FIG. 36 is a fragmentary longitudinal sectional view of the blow molding body cavity half of FIG. 33 taken along line 36—36 thereof.

Thus, the preform 52 is first subjected to a relatively low pressure "puff" and then to a relatively high pressure "blow" to effect the blow molding of the body portion of the preform 52 from the configuration shown in FIG. 32 to the configuration shown in FIG. 33 to convert it into container 54, FIG. 13.

After the blow molding interval timer 448 has timed out, switch 462 is reversed whereupon power is applied from wire 460 to wire 470. This energizes coil 471 of relay 472 which closes contact 473. Contact 473 applies power from wire 400 to wire 474 which energizes solenoid valve 475. This valve vents the blow mold cavity.

While the blow mold cavity was pressurized, switch 480 was held open by bellows 481. Thus, after the blow mold cavity has been depressurized to substantially ambient pressure, switch 480 closes and applies power to wire 482. Power on wire 482 energizes solenoid valve 483 which causes the blow molding body cavity halves 291, 292 to be spaced to their OPEN positions, FIG. 34, whereupon the completed container 54 can be removed.

Without unduly repeating the description of the operation of timer 448, in view of the previous description of timer 408, timer 448 will then "rest" with its clutch 447 energized and its switches 449, 450, 452, and 462 reversed from the position shown in FIG. 37.

To reset the control circuit, switch 405 is opened. This causes timers 408 and 448 to be reset, and relays 432, 468, and 472 to be de-energized. The control circuit is then ready to begin a new cycle by closing switch 405 after a new preform 52 has been placed on mandrel 283.

The preferred embodiment discrete blow molding apparatus 202, FIG. 26, has been described as comprising a mandrel 283, having faces 315, 316, FIG. 28. The faces 315, 316 are spaced, cooled and configured to confine or constrain the bulkhead 53 of a preform 52 disposed on the mandrel 283 to obviate changing the size, shape, or orientation of bulkhead 53 while the body portion of the preform is blow molded to convert the preform 52 into a bulbous-shape container 54, FIG. 33.

It is believed that the mandrel 283 substantially obviates heating the bulkhead 53 of a preform 52 disposed thereon when the preform 52 is heated as described hereinbefore. This is because the bifurcations of the mandrel shield the bulkhead from radiant heat within heater 285 and because the bulkhead is sandwiched between the liquid cooled bifurcations of the mandrel. Thus, it is believed that size and shape changes of bulkhead 53 are substantially obviated because the temperature of the bulkhead is maintained below the thermoplastic temperature of the preform material, and that changes in the orientation of bulkhead 53 are substantially obviated because the mandrel indeed constrains or confines the bulkheads sufficiently to substantially obviate orientation changes.

ALTERNATE PREFORM

The preferred, integrated injection-blow molding apparatus, FIGS. 1 and 6, and the preferred discrete blow molding apparatus 202, FIG. 26, have been described in conjunction with converting injection molded preforms 52, FIG. 17, into bulbous-shape containers 54, FIG. 13. The discrete blow molding apparatus 202, FIG. 26 can, however, as stated hereinbefore, be used to convert extruded, longitudinally partitioned, extruded tubular preforms 203, FIGS. 38 and 39, into containers 54, FIG. 13.

Without undue redundancy, when the blow molding apparatus 202, FIG. 26, is used to convert extruded preforms 203, FIGS. 38 and 39, into containers 54, FIG. 13, the pinch-off means of the body cavity halves 291 and 292 must pinch an end of the preform 203 closed rather than merely pinching-off the tubular extensions on injection molded preforms 52.

While it is believed that the preferred apparatus produces high quality, precisely partitioned, bulbous-shape containers 54, FIG. 13, because of the inherent advantages derived from injection molded preforms, the mandrel 283 and the edges 320 of the blow molding apparatus 202 will constrain or confine the bulkheads 53a of extruded preforms 203 to substantially obviate the bulkheads from changing size, shape, or orientation while the tubular exterior walls are being blow molded to form container 54.

While particular embodiments of the present invention have been illustrated and described, it will be obvious to those skilled in the art that various changes and modifications can be made without departing from the spirit and scope of the invention. It is intended, therefore, to cover in the appended claims, all such changes and modifications that are within the scope of this invention.

What is claimed is:

1. An improved injection-blow molding apparatus for injection molding a relatively deep preform of thermoplastic material and for blow mold converting such a preform into a closed-bottom container, said apparatus including a butt plate assembly, a male mandrel which is cantilevered from said butt plate assembly so that it has an unsupported distal end and which mandrel has a sufficiently large slenderness ratio that its cantilevered strength is insufficient to substantially obviate displacement of its distal end when subjected to unevenly distributed pressure during injection molding cycles, an injection molding body, an injection head assembly, a blow molding body, means for associating the butt plate assembly, the male mandrel, the injection molding body and the injection head assembly to form an injection mold cavity, means for injecting thermoplastic material into the injection mold cavity to form a said preform, means for disassociating the injection molding body and the injection head assembly from the butt plate assembly and the mandrel and for associating the blow molding body with the butt plate assembly and the mandrel so that a blow molding cavity is formed about said preform, means for conducting a blow molding medium into said preform so that said preform is converted into said container, and means for removing said container from said apparatus, said improvement comprising a blow-molding-medium passageway in the mandrel which terminates at a hole in the distal end of the mandrel, an improved injection head assembly, and an improved blow molding body, said improved injection head assembly comprising means for sealing said hole in the distal end of the mandrel and for mechanically supporting the distal end of the mandrel to substantially obviate displacement thereof while said preform is being injection molded, and means for defining a tubular extension of said injection mold cavity adjacent said hole in the distal end of the mandrel so that said preform has a hollow tubular extension on its bottom end, said improved blow molding body comprising means for pinching said tubular extension closed as it is being associated with the butt plate assembly and the mandrel so that said container has a closed bottom end.

2. The improved apparatus of claim 1 wherein said means for sealing said hole and for mechanically supporting the distal end of the mandrel comprises a pin which is cantilevered from said injection head assembly which pin has a distal end adapted to sealingly fit in said hole in the distal end of said mandrel.

* * * * *